(12) United States Patent
Cherniack et al.

(10) Patent No.: US 8,671,091 B2
(45) Date of Patent: Mar. 11, 2014

(54) OPTIMIZING SNOWFLAKE SCHEMA QUERIES

(75) Inventors: Mitch Cherniack, Chelsea, MA (US); Shilpa Lawande, Nashua, NH (US); Nga Tran, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/461,937

(22) Filed: Aug. 2, 2006

(65) Prior Publication Data

US 2008/0033914 A1    Feb. 7, 2008

(51) Int. Cl.
*G06F 7/00*    (2006.01)
(52) U.S. Cl.
USPC .......................... 707/714; 707/606; 707/791
(58) Field of Classification Search
USPC .......................................... 707/606, 714, 791
See application file for complete search history.

(56) References Cited

U.S. PATENT DOCUMENTS

| | | | |
|---|---|---|---|
| 5,345,585 A | 9/1994 | Iyer et al. | |
| 5,423,037 A | 6/1995 | Hvasshovd | |
| 5,794,228 A | 8/1998 | French et al. | |
| 5,794,229 A | 8/1998 | French et al. | |
| 5,848,408 A * | 12/1998 | Jakobsson et al. | 707/714 |
| 5,878,409 A | 3/1999 | Baru et al. | |
| 5,918,225 A | 6/1999 | White et al. | |
| 5,960,423 A | 9/1999 | Chaudhuri et al. | |
| 6,009,432 A | 12/1999 | Tarin | |
| 6,029,163 A | 2/2000 | Ziauddin | |
| 6,105,020 A | 8/2000 | Lindsay | |
| 6,421,687 B1 | 7/2002 | Klostermann | |
| 6,801,903 B2 | 10/2004 | Brown et al. | |
| 6,879,984 B2 | 4/2005 | Duddleson et al. | |
| 7,024,414 B2 | 4/2006 | Sah et al. | |
| 7,139,783 B2 | 11/2006 | Hinshaw et al. | |
| 7,464,247 B2 | 12/2008 | Uppala | |
| 7,483,918 B2 | 1/2009 | Chaudhuri et al. | |
| 2002/0116357 A1* | 8/2002 | Paulley | 707/1 |
| 2004/0260684 A1 | 12/2004 | Agrawal et al. | |
| 2005/0065939 A1* | 3/2005 | Miao | 707/100 |
| 2005/0187977 A1 | 8/2005 | Frost | |
| 2005/0203940 A1 | 9/2005 | Farrar et al. | |
| 2005/0283658 A1 | 12/2005 | Clark et al. | |
| 2006/0085484 A1 | 4/2006 | Raizman et al. | |
| 2006/0184338 A1 | 8/2006 | Lightstone et al. | |
| 2006/0253473 A1 | 11/2006 | Agrawal et al. | |
| 2006/0282423 A1* | 12/2006 | Al-Omari et al. | 707/4 |

(Continued)

FOREIGN PATENT DOCUMENTS

WO    2008016877    2/2008

OTHER PUBLICATIONS

"Schema Modeling Techniques," Oracle Database Data Warehousing Guide, 2001.*
"Schemes," Oracle8i Data Warehousing Guide, 1999.*

(Continued)

*Primary Examiner* — Cheyne D Ly

(57) ABSTRACT

For a database query that defines a plurality of separate snowflake schemas, a query optimizer computes separately for each of the snowflake schemas a logical access plan for obtaining from that schema's tables a respective record set that includes the data requested from those tables by that query. The query optimizer also computes a logical access plan for obtaining the query's results from the record sets in which execution of the logical access plans thus computed will result.

25 Claims, 12 Drawing Sheets

(56) References Cited

U.S. PATENT DOCUMENTS

2007/0027904 A1* 2/2007 Chow et al. .................. 707/102
2007/0067261 A1 3/2007 Burger et al.
2008/0281784 A1 11/2008 Zane et al.

OTHER PUBLICATIONS

"16 Schemas," Oracle8i Data Warehousing Guide, 1999 <http://download.oracle.com/docs/cd/A81042_01/DOC/server.816/a76994/schemas.htm>.*
"16 Schemes," Oracle8i Data Warehousing Guide, 1999.*
Tao et al., "Optimizing Large Star-Schema Queries with Snowflakes via Heuristic-Based Query Rewriting," IBM Canada Ltd., 2003.*
Abadi et al., "Materialization Strategies in a Column-Oriented DMBS," *Proceedings of ICDE*, 2007, Istanbul, Turkey, 10 pages.
Abadi, Daniel, "Redefining Physical Data Independence," *Proceedings of CIDR*, Jan., 2007, 6 pages.
Agrawal et al., "Automated Selection of Materialized Views and Indexes for SQL Databases," *Proceedings of the 26th International Conference on Very Large Databases*, Cairo, Egypt, 2000, pp. 496-505.
Agrawal et al., Integrating Vertical and Horizontal Partitioning into Automated Physical Database Design, *SIGMOD*, Jun. 13, 2004, 12 pages.
Baralis et al., "Materialized View Selection in a Multidimensional Database," in *Proceedings of the 23rd VLDB Conference*, Athens, Greece, 1997, pp. 156-165.
Chaudhuri et al., "An Efficient Cost-Driven Index Selection Tool for Microsoft SQL Server," *Proceedings of the 23rd VLDB Conference Athens*, Greece, 1997, pp. 146-155.
Gupta et al., "Selection of Views to Materialize under a Maintenance-Time Constraint," International Conference on Database Theory (ICDT), 1999, pp. 453-470.
"IBM Universal Database for Linux, Unix, and Windows," Product Manual, Version 7, 68 pages, http://www-306.ibm.com/software/data/db2/udb/support/manualsv7.html.
"IBM Universal Database for Linux, Unix, and Windows," Product Manual, Version 7.2, 94 pages, http://www-306.ibm.com/software/data/db2/udb/support/manualsv7.html.
Ioannidis et al., "Left-Deep vs. Bushy Trees: An Analysis of Strategy Space and ITS Implications for Query Optimization," Computer Sciences Department, University of Wisconsin, Madison, WI, 1991, pp. 168-177.
Ono et al., "Measuring the Complexity of Join Enumeration in Query Optimization," *Proceedings of the 16th VLDB Conference*, Brisbane, Australia, Aug. 13-16, 1990), pp. 314-325.
Papadomanolakis et al., "AutoPart: Automating Schema Design for Large Scientific Databases Using Data Partitioning," *Proc. 16th International Conference on Scientific and Statistical Database Management* (SSDBM 2004), Santorini Island, Greece, Jun. 2004, 10 pages.
Pellenkoft et al., "The Complexity of Transformation-Based Join Enumeration," *Proceedings of the 23rd VLDB Conference*, Athens, Greece, 1997, pp. 306-315.
Selinger et al., "Access Path Selection in a Relational Database Management System," IBM's System R Optimizer, *Proceedings of the ACM SIGMOD Conference on the Management of Data*, Boston, MA, May, 1979), pp. 23-34.
Stonebraker et al., "C-Store: A Column-Oriented DBMS," *Proc. 31st VLDB Conference*, Trodheim, Norway, 2005, 12 pages.
Tian-Lei et al., "Automatic Relational Database Compression Scheme Design Based on Swarm Evolution," *Journal of Zhejiang University*, published Apr. 5, 2006, pp. 1642-1651.
Vance et al., "Rapid Bush Join-Order Optimization with Cartesian Products," *Proceedings of the 1996 ACM SIGMOD International Conference on Management of Data*, Montreal, Quebec, Canada, Jun. 4-6, 1996), pp. 35-46.
Zilio et al., "DB2 Design Advisor; Integrated Automatic Physical Database Design," *Proc. 30th VLDB Conference*, Toronto, Canada, Sep. 2004, p. 1087-1097.

International Search Report and Written Opinion for PCT Application No. PCT/US07/74740, dated Jul. 3, 2008.
International Search Report and Written Opinion for PCT Application No. PCT/US07/74741, dated Jul. 24, 2008.
Galindo-Legaria, Cesar A. et al. "Outerjoin Simplification and Reordering for Query Optimization," ACM Trans. Database Syst. 22(1) pp. 43-73 (1997).
Piraheash, Hamid et al. "Extensible/Rule Based Query Rewrite Optimization in Starburst," IBM Almaden Research Center, San Jose, CA, pp. 39-48.
Uno, Takeaki "An Algorithm for Enumerating all Directed Spanning Trees in a Directed Graph," In Proceedings of the 7th International Symposium on Algorithms and Computation, Lecture Notes in Computer Science; vol. 1178, 1996, pp. 166-173.
Valentin et al., "DB2 Advisor: An Optimizer Smart Enough to Recommend Its own Indexes," *Proc. ICDE Conf.*, 2000, pp. 101-110.
International Preliminary Report on Patentability for PCT Application No. PCT/US07/74740, dated Feb. 12, 2009.
International Preliminary Report on Patentability for PCT Application No. PCT/US07/74741, dated Feb. 12, 2009.
Turner et al., "A DDMS for Large Statistical Databases," Statistics Canada, 1979.
"RAPID DBMS Manual," Statistics Canada, 1978.
"RAPID Programmers Guide," Statistics Canada, 1978.
"RAPID File Design Manual," Statistics Canada, 1978.
"RAPID Database Retrieval Manual," Statistics Canada, 1978.
"RAPID Language Reference," Statistics Canada, 1978.
"RAPID Database Creation," Statistics Canada, 1978.
Baker, Margaret, "User's Guide to the Berkeley Transposed File Statistical System," Survey Research Center Technical Report Number One, Jan. 1974.
Brun et al., "Visualization of Scientific Data for High Energy Physics. PAW++, KUIP, PIAF: General-Purpose Portable Software Tools for Data Analysis and Presentation," European Organization for Nuclear Research, 1993.
Burnett et al., "Data Management Support for Statistical Data Editing and Subset Selection," Proceedings of the 1st LBL Workshop on Statistical Database Management, 1981.
Wong et al., "Bit Transposed Files," Proceedings of VLDB 85, Stockholm, 1985.
Weeks et al., "Flexible Techniques for Storage and Analysis of Large Continuous Surveys," Proceedings of the First LBL Workshop on Statistical Database Management, Mar. 1982.
Farsi et al., "A Relational Database for Efficient Processing of Statistical Queries," Proceedings of the Second International Workshop on Statistical Database Management, 1983.
Boral et al., "Prototyping Bubba, A Highly Parallel Database System," IEEE Trans. on Knowledge and Data Engineering, Mar. 1990.
Hawthorn, "Microprocessor Assisted Tuple Access, Decompression and Assembly for Statistical Database Systems," Proceedings of the 8th VLDB, 1982.
Tsuda et al., "Transposition of Large Tabular Data Structures with Applications to Physical Database Organization—Part I. Transposition of Tabular Data Structures and Part II. Applications to Physical Database Organization," ACTA Information, vol. 19, 1983.
Andersson, "A Study of Modified Interpolation Search in Compressed, Fully Transposed, Ordered Files," Proceedings of the 4th International Conference on Statistical and Scientific Database Management, 1988.
Tanaka, "A Data-stream Database Machine with Large Capacity," Advanced Database Machine Architecture, 1983.
Muthuraj et al., "A Formal Approach to the Vertical Partitioning Problem in Distributed Database Design," *Proc. Parallel and Distr. Inf. Sys.*, San Diego, CA, Jan. 1993.
Hammer et al., "A Heuristic Approach to Attribute Partitioning," Laboratory for Computer Science, 1979.
Cochinwala et al., "A Multidatabase System for Tracking and Retrieval of Financial Data," Proceedings of the 20th VLDB Conference Santiago, Chile, 1994.
Khoshafian et al., "A Query Processing Strategy for the Decomposed Storage Model," Microelectronics and Computer Technology Corporation, 1987.

(56) References Cited

OTHER PUBLICATIONS

Cornell, "A Vertical Partitioning for Relational Databases," IBM Thomas J. Watson Research Center, 1987.
"Adabas-Rapid Demonstration Databases, " Database Examples, 1978.
Thomas and Hall, "ALDS Project: Motivation, Statitical Database Management Issues, Perspectives, and Directions," Proceedings of the $2^{nd}$ International Workshop on Statistical Database Management, 1983.
Cornell et al., "An Effective Approach to Vertical Partitioning for Physical Design of Relational Databases," IEEE Transactions on Software Engineering, vol. 16, No. 2, Feb. 1990.
"An Introduction to Multidimensional Database Technology," Kenan Systems Corporation, 1993-1995.
Cressman, "Analysis of Data Compression in the DLT2000 Tape Drive," Digital Technical Journal vol. 6, No. 2, 1994.
Khoshafian et al., "Efficient Support of Statistical Operations," IEEE Trans. on Software Engineering, vol. SE-11, No. 10, Oct. 1985, 1985.
Bleier et al., "File Organization in the SDC Time-Shared Data Management System (TSMS)," North-Holland Publishing Company, 1969.
Schek et al., "Information Retrieval with APL by Adaptive Index and User Guidance," Information Retrieval with APL, 1980.
O'Neil, "Model 204 Architecture and Performance," Presented at $2^{nd}$ International Workshop on High Performance Transaction Systems, Sep. 1987.
March, "On the Selection of Efficient Record Segmentations and Backup Strategies for Large Shared Databases," ACM Transactions on Database Systems, vol. 9, No. 3, Sep. 1984.
"Sadas Brochure," Advanced Systems s.r.l.
"Sadas QA," Advanced Systems s.r.l.
Seshadri et al., "Sequence Query Processing," Sigmod, 1994.
Alsberg, "Space and Time Savings Through Large Data Base Compression and Dynamic Restructuring," Proceedings of the IEEE vol. 63, No. 8, Aug. 1975.
Goil et al., "Sparse Data Storage of Multi-Dimensional Data for OLAP and Data Mining, "Department of Electrical & Computer Engineering Center for Parallel and Distributed Computing, 1994.
Shoshani, "Statistical Databases: Characteristics, Problems, and Some Solutions," Proceedings of the Eighth International Conference on Very Large Data Bases, Sep. 1982.
Richardson, "Supporting Lists in a Data Model (A Timely Approach)," Proceedings of the $18^{th}$ VLDB Conference Vancouver, British Columbia, Canada, 1992.
Navathe, "Vertical Partitioning Algorithms for Database Design," ACM Transactions on Database Systems, vol. 9, No. 4, Dec. 1984.
Navathe, "Vertical Partitioning for Database Design: A Graphical Algorithm," Database Systems Research and Development Center, 1989.
D. S. Batory, "On Searching Transposed Files," ACM Transactions on Database Systems, vol. 4, No. 4, Dec. 1979.
Goldstein, "Files-11 On-Disk Structure Specification," Digital Equipment Corporation, Jan. 15, 1979.
C.J. Date, "An Introduction to Database Systems, vol. 1," Addison-Wesley Publishing Company, 1990.
Ailamaki et al., "Weaving Relations for Cache Performance," Proceedings of the $27^{th}$ VLDB Conference, Roma, Itlay, 2001, 12 pages.
Apache Cassandra "Data Model" [online], [retrieved on May 29, 2009]. Retrieved from the Internet <URL: http://cwiki.apache.org/confluence/display/CSDR/Pata+Model >, 2 pages.
Cohen et al., MAD Skills: New Analysis Practices for Big Data [online], [retrieved May 29, 2009]. Retrieved from the Internet <URL: http://db.cs.berkeley.edu/papers/vldb09-madskills.pdf>, 12 pages.
DBMS2—The secret sauce to Clearpace's compression [online], [retrieved May 29, 2009]. Retrieved from the Internet<URL: http://www.dbms2.com/2009/05/14/the-secret-sauce-to-clearnaces-compression/>, 6 pages.
Elmasri et al., "Fundamentals of Database Systems." The Benjamin/Cummings Publishing Company, Inc., 1989.

Greenplum—Greenplum Database 3.3—Features [online], [retrieved Jul. 13, 2009]. Retrieved from the Internet <URL: http://www.greenplum.com/products/features/>, 6 pages.
Inmon et al., "The Dynamics of Data Base," Prentice Hall, 1986.
Khoshafian et al., "Efficient Support of Statistical Operations," IEEE Trans. On Software Engineering, vol. SE-11, No. 10, Oct. 1985, 13 pages.
Kickfire "The First Analytic Appliance for the Mass Market, Blog comment," [online], (retrieved on Aug. 6, 2009). Retrieved from the Internet: <URL: http://www.kickfire.com/blog/?p-392>, 4 pages.
Korth et al., "Database System Concepts," Second Edition, McGraw-Hill, Inc., 1991.
McCarthy, J. L., "Enhancements to the Codata Data Definition Language," Feb. 1982.
McKusick et al., "A Fast File system for UNIX," Computer ACM Transactions on Computer Systems 2, 3 (Aug. 1984), pp. 181-197.
Muthuraj et al., "A Formal Approach to the Vertical Partitioning Problem in Distributed Database Design," CIS Department University of Florida and College of Computing Georgia, a Technical paper, 1992, 24 pages.
Naeker, Philip A. H. "Real-World Interoperability", Part 4, RDBMS Maturity, vol. 10, No. 12, Nov. 1991, 8 pages.
Schaffner et al., "A Hybrid Row-Column OLTP Database Architecture for Operational Reporting" [online], [retrieved on May 29, 2009]. Retrieved from the Internet <URL: http://www.vldb.org/conf/2008/workshops/WProc_BIRTE/p7-schaffner.pdf>, 14 pages.
Shasha, Dennis E. "Database Tuning," Prentice Hall PTR, 1992.
Stonebraker, Michael, Readings in Database Systems, Second Edition, Morgan Kaufmann, 1994.
Wiederhold, Gio, "Database Design," McGraw-Hill Book Company, 1983.
Abadi, Daniel, "A Tour Through Hybrid Column/row-Oriented DBMS Schemes," [online], [retrieved Sep. 9, 2009]. Retrieved from Internet: <URL: http://dbmsmusings.blogspot.com/2009/09/tour-through-hybrid-columnrow-oriented.html>, 10 pages.
Abadi et al., "Column-Stores vs. Row-Stores: How Different Are They Really?" SIGMOD '08, Jun. 9-12, 2008, Vancouver, British Columbia, 14 pages.
Abadi, Daniel, "Watch Out for VectorWise," [online], [retrieved Sep. 9, 2009]. Retrieved from Internet: <URL: http://dbmsmusinqs.blogspot.com/2009/07/watch-out-for-vectorwise.html>, 9 pages.
Boncz et al., "MonetDB/X100: Hyper-Pipelining Query Execution," Proceedings of the 2005 CIDR Conference, 13 pages.
Cudre-Mauroux et al., "The Case for RodentStore, an Adaptive, Declarative Storage System," $4^{th}$ Biennial Conference on Innovative Data Systems Research (CIDR), Jan. 4-7, 2009, Asilomar, California, 7 pages.
DBMS2—"Pax Analytica? Row- and Column-Stores Begin to Come Together," [online], (retrieved o Sep. 9, 2009]. Retrieved from Internet: <URL: http://www.dbms2.com/2009/08/04/pax-analytica-row-and-column-stores-begin-to-come-together/>, 7 pages.
Hankins et al., "Data Morphing: An Adaptive, Cache-Conscious Storage Technique," Proceedings of the $29^{th}$ VLDB Conference, Berlin, Germany, 2003, 12 pages.
Howard, Philip, "The optimal warehouse," [online], (retrieved on Sep. 9, 2009]. Retrieved from Internet: <URL: http://www.it-director.com/technology/data_magmt/contentphp?cid-11453>, 2 pages.
Shao et al., "Clotho: Decoupling Memory Page Layout from Storage Organization," Carnegie Mellon University, Proceedings of the $30^{th}$ VLDB Conference, Toronto, Canada, 2004, 12 pages.
Townsend et al., "Lowering Your IT Costs with Oracle Database 11g Release 2," An Oracle Corporation White Paper, Sep. 2009, 23 pages.
Zhou et al., A Multi-resolution Block Storage Model for Database Design, Proceedings of the Seventh International Database Engineering and Applications Symposium (IDEAS '03), 4 pages.
Zukowski et al., DSM vs. NSM : CPU Performance Tradeoffs in Block-Oriented Query Processing, Proceedings of the Fourth International Workshop on Data Management on New Hardware, Jun. 13, 2008, Vancouver, Canada, 8 pages.
Son J.H. et al.: "An Adaptable Vertical Partitioning Method in Distributed Systems", Journal of Systems and Software, Elsevier North

(56) References Cited

OTHER PUBLICATIONS

Holland, New York, NY, US LNKD-DOI: 10.1016/J.JSS.2003.04. 002, vol. 73, No. 3, Nov. 1, 2004, pp. 551-561, XP004560798 ISSN: 0164-1212, 11 pages.

Harizopoulos, et al., "Performance Tradeoffs in Read-Optimized Databases"., Proceedings of the International Conference on Very Large Data Bases., VLDB Conference, Rome, Italy, Sep. 11-14, 2001., Morgan Kaufman, Orlando, FLA., Sep. 12, 2006., pp. 487-496.

Stonebraker, et al., "C-Store: A column-oriented DBMS"., Proceedings of the 31$^{st}$ VLDB Conference, Trondheim, Norway, 2005.

Vertica Systems Inc., "The Vertica Analytic Overview White Paper", [Online] Nov. 2008, pp. 1-13, Retrieved from the Internet: URL:http://www.acctiva.co.uk/userfiles/file/VerticaArchitectureWhitePaper.pdf [retrieved on Sep. 19, 2010].

Communication Relating to the Results of the Partial International Search for PCT Application No. PCT/US2010/041898, dated Oct. 13, 2010, 8 pages.

Steinbrunn, et al., "Heuristic and Randomized Optimization for the Join Ordering Problem," VLDB Journal, Spring Verlag, Berlin, DE LINKD—DOI: 10.1007/500778005040, vol. 6, No. 3, Aug. 1, 1997, pp. 191-208, XP000957755, ISSN: 1066-8888, the whole document.

Supplementary European Search Report for EP Application No. EP 07799914, dated May 28, 2010, 4 pages.

International Search Report and Written Opinion for PCT Application No. PCT/US2010/023216, dated Aug. 3, 2010, 16 pages.

"Schemas, Oracle8i Data Warehousing Guide", Oracle 8I Release 2 (8.1.6), Dec. 1999, XP008103187; 8 pages.

EPO; "Supplementary European Search Report" cited in EP 07799915.9; mailed Nov. 28, 2012; 4 pages.

Lane, P., et al.; "Oracle 8i"; Oracle; Dec. 1999; XP002686963; 1 page.

Tao, Y., et al.; "Optimizing Large Star-Schema Queries with Snowflakes via Heuristic-Based Query Rewriting"; IBM Canada Ltd.; 2003; XP008103218; 16 pages.

* cited by examiner $F_1$ = (A1, A2, FK1, FK2)
$F_2$ = (B1, B2, FK3, FK4, FK5)
$F_3$ = (C1, C2, FK6)

```
SELECT  M, P, R, SUM (A2), MAX (B2), MIN (C2)
FROM F1, F2, F3, D1, D2, D3, D4, D5, D6
WHERE     FK1 = PK1
    AND   FK2 = PK2
    AND   FK3 = PK3
    AND   FK4 = PK4
    AND   FK5 = PK5
    AND   FK6 = PK6
    AND   A1 = B1
    AND   B1 = C1
    AND   G = 10
    AND   H > 10
    AND J = 0
    AND K > 1
GROUP BY M, P, R
ORDER BY N, Q, S
```

FIG. 10

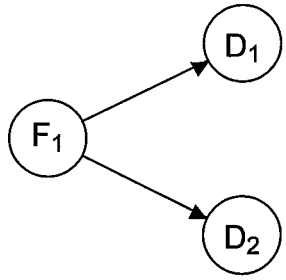
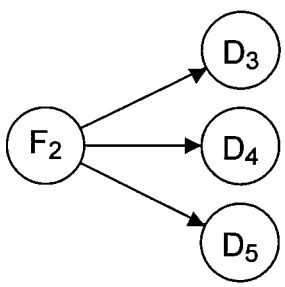
FIG. 11
$Q_1$ (FROM PARTITION 1) =
    SELECT  A1, A2, M, N
    FROM    $F_1$, $D_1$, $D_2$
    WHERE  FK1 = PK1
       AND    FK2 = PK2
       AND    G = 10
       AND    H > 10
$Q_2$ (FROM PARTITION 2) =
    SELECT  B1, B2, P, Q, R
    FROM    $F_2$, $D_3$, $D_4$, $D_5$
    WHERE  FK3 = PK3
       AND    FK4 = PK4
       AND    FK5 = PK5
       AND    J = 0
       AND    K > 1
$Q_3$ (FROM PARTITION 3) =
    SELECT  C1, C2
    FROM    $F_3$, $D_6$
    WHERE  FK6 = PK6
FIG. 13
$Q_a$ =  SELECT     M, P, R, SUM (A2), MAX (B2), MIN (C2)
      FROM       $Q_1$, $Q_2$, $Q_3$
      WHERE     A1 = B1
          AND  B1 = C1
      GROUP BY  M, P, R
      ORDER BY  N, Q, S
FIG. 14

PF1$_a$ = (A1, A2, FK1, FK2 | A1)
PF1$_b$ = (A1, A2, FK2, D1.G, D1.M | D1.G)
PF1$_c$ = (A1, A2, FK1, D2.H, D2.N | D2.H)
PD1$_a$ = (PK1, G, M | M)
PD2$_a$ = (PK2, H, N | PK2)
PD2$_b$ = (PK2, H, N | H)
FIG. 16
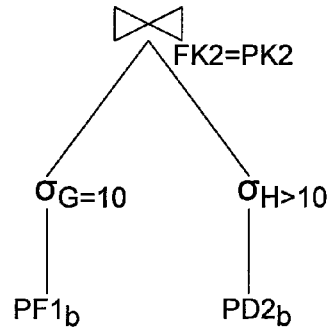
FIG. 17
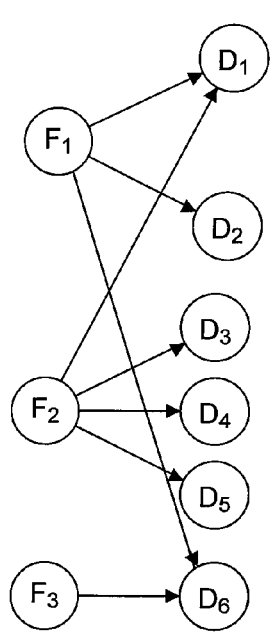
FIG. 18
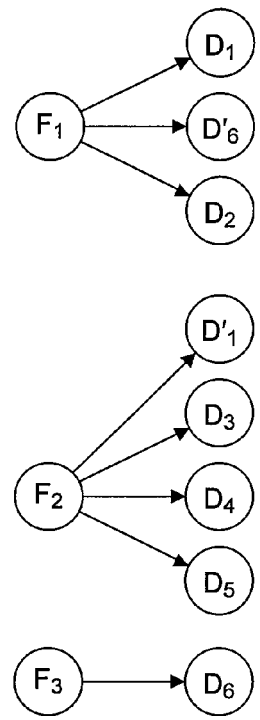
FIG. 19

OPTIMIZING SNOWFLAKE SCHEMA QUERIES

BACKGROUND OF THE INVENTION

1. Field of the Invention

The present invention is directed to database management systems and in particular to the ways in which the execution of database queries can be optimized.

2. Background Information

A. Data Warehouses

Conventional database systems were developed in the 1970's to deal with applications in which workloads were dominated by writes. Consider a bank in which a teller initiates high-priority database transactions. Each transaction's goal is to reflect customer withdrawals and deposits quickly and accurately in the database. Applications of this nature are sometimes characterized by the term On-Line Transaction Processing (OLTP). OLTP is concerned more with making writes fast than with expediting reads. These applications typically need access to the most-current data. Row stores are a response to this need.

In contrast, there is another class of applications in which the workload is dominated by read operations. These applications tend to occur in decision-support settings. Consider a buyer for a large retail chain. Such a user is concerned with looking for patterns and trends in historical data in order to forecast what items might sell well in the future. Applications of this type are sometimes characterized by the term On-Line Analytical Processing (OLAP). OLAP is concerned more with read speed than with write speed. Data warehouses, in general, are a response to this need. Column stores (described in a later section) are a special class of hyper-fast data-warehouse system.

In many cases, OLAP does not need the most-current data. A typical deployment may load the current day's data at night, making the database for OLAP as much as twenty-four hours out of date. Since the applications are more concerned with historical trends, this is acceptable in a lot of cases.

Data-warehouse systems have been developed to deal with OLAP applications. Data warehouses are typically very big. It is common for a data warehouse to involve 10 to 100 terabytes of data. In order to make managing these massive data sets more tractable, data warehouse systems have taken advantage of the typical data relationships that are found in these applications. The next few sections describe these relationships.

Table Roles in Data Warehouses

Typically there is one very big table that accumulates the history of the important events in the application. New events are frequently appended to this table, which is commonly called the fact table. As an example, consider a data warehouse for a large retail chain. The fact table may contain one record for each item that is bought at one of the many stores. In other words, each scanning operation at a point-of-sale terminal would generate one record in the fact table.

Each purchase can be described along many dimensions. For example, a given purchase can be described in terms of the store at which it was bought. If queries seek, say, all purchases that were made in New York, information about each transaction's location has to be stored. However, rather than store this and other such descriptive information with each record in the fact table—and thereby make the fact table huge—such information is typically factored out into separate tables called dimension tables. The primary key of each dimension table—i.e., the attribute (or, occasionally, set thereof) that the database management system prevents from having the same value in more than one of that dimension table's records—is embedded in the fact table. We call the embedded primary key a foreign key in the context of the fact table. Thus, answering questions about purchases in a given state would involve a join of the fact table with the dimension table called Store on the corresponding primary-key/foreign-key attributes.

Schemas that have this primary-key/foreign-key relationship between one fact table and many dimension tables are referred to as star schemas since such a schema can be represented graphically by a central fact-table node connected to surrounding dimension-table nodes by edges that represent a primary-key/foreign-key joins. In a star schema, the dimension tables are not connected to each other directly. The embedded key relationship between the fact table and a dimension table is necessarily an n-to-one relationship. So the join of the fact table with a dimension table has only as many rows as there are rows in the fact table.

Sometimes, a dimension table can be further qualified by additional dimension tables. A good example of this is a dimension table called "State" that has fifty rows and that has information like the state's population, and another dimension table, called "County," that includes one row for each county for each state. The County table would include the State table's primary key as one of its (foreign-key) attributes. The County table may contain further descriptors, like mean family income. This would be handled in much the same way as the fact-to-dimension relationships described above, i.e., by embedding foreign keys in the obvious way. This generalization of a star schema is called a snowflake schema because of the clear geometric analogy.

Another way to view this employs a graph representation of the schema. We can think of the foreign-key-to-primary-key relationship expressed in a schema S as describing a directed graph $G=(V, E)$ in which the vertices V are S's relations and the edges E are of the form $(R_i, R_j)$, where $R_i$ contains a foreign key and $R_j$ contains the corresponding primary key. $R_i$ is the source vertex, and $R_j$ is the sink vertex. A schema that can be depicted as a graph in which one vertex F has no incoming edge and in which each other node has only a single incoming edge (i.e., tree graph) is called a snowflake schema. If the longest path in such a schema graph is of length one, then we call the schema a star schema. This kind of graph-based schema representation will come up again later.

B. Column Store Database Architectures

Although the applicability of the invention to be described below is not limited to any particular physical database layout, some of its advantages will be particularly manifest when it is applied to databases implemented as "column stores." A column store differs from the more traditional row-store architecture in that data in a column store are stored on disk clustered by column rather than by row.

FIG. 1 illustrates this distinction. A logical database design usually comprises one or more conceptual tables such as FIG. 1's table 20. A table is characterized by a set of attributes, usually depicted as column headings, for which each record in the table has respective (albeit potentially empty) values. In table 20, for instance, the attributes are Emp# (employee number), Dept (department), Room, Phone, and Age. In conventional, horizontal storage arrangements, values of a given record's successive attributes are typically stored physically adjacent to one another, as FIG. 1's depiction of row store 22 suggests. Although some databases will partition a table horizontally into multiple files, the drawing depicts the illustrated logical table's contents as contained in a single file, in which the values are stored in the following order: row 1 (Emp#), row 1 (Dept), row 1 (Room), row 1 (Phone), row 1 (Age), row 2 (Emp#), etc. In other words, the table is stored in a manner that reflects visiting the table's contents by reading each row from left to right and then moving to the next row. The order of rows can be arbitrary, or it can be based on a given set of attributes, in which case the table is effectively sorted before it is stored onto disk.

Horizontal data storage has been the traditional physical-storage approach, in part because it makes initial storage of an individual record relatively fast; to store a given record usually requires access only to, say, a single disk block. But there are a great many databases in which reading occurs much more frequently than writing. For such databases, it is often better for the physical layout to be vertical, as FIG. 1's column store 24 depicts: successive storage locations are occupied by different records' values of the same attribute. Unlike row store 22, which would typically store the entire table in a single file, a column store 24 is usually implemented by storing each column in one or more separate files. Thus, there is a file for the Emp# column, with values appearing in the order first row, second row, third row, etc., a file for the Dept column, with values also appearing in the order first row, second row, third row, etc., and so on.

One reason why a vertical storage arrangement is preferable for data reading is that fetching the results of a query requires access to only enough, say, disk blocks to contain the values of the attributes of interest; there is no need to access enough disk blocks to contain all of the attributes of all of the records that meet the query criteria.

C. Sort Orders

A key physical-database-design choice for both row stores and column stores is the order in which rows or columns are stored. For example, FIG. 1's table 20 may be ordered in a row store on attribute Room, in which case the first row in the table (Room=101) would be followed by the third row (Room=105) followed by the second row (Room=203). The choice of sort order strongly influences both query and update performance. For example, if table 20 is physically sorted on Room, then queries that include predicates on Room can be evaluated without scanning the entire table, either with a binary search, or more commonly, by using a sparse index that typically is placed over the sort attribute. A common choice of sort order for a table in a row store is that of its primary key, since this facilitates insertions and updates that must be accompanied by checks for violations of key constraints.

D. Query Optimization

A query is a request for data. All DBMSs translate queries into algorithmic access plans that get compiled or interpreted into code that returns the data specified by the query. The process of translating a query into an access plan is called query optimization, and the most common paradigm for query optimization is cost-based query optimization.

Logical-Plan Generation

A query optimizer first transforms a (typically, SQL) query into a logical plan. A logical plan is a tree of logical operations, where a logical operation is a specification of a class of physical operations that all have the same semantics. Each of the logical operations can be realized with potentially different algorithms.

Often, a query optimizer will precede its cost-based step with a query-rewriting step. Query rewriting consists of applying equivalence-preserving transformations to the query expression to arrive at a new expression that is likely to be cheaper to evaluate. The classic example of such a rewrite is pushing predicates below joins in the query expression tree. Applying the predicate first reduces the join inputs' sizes.

An example language for logical plans is the relational algebra, which includes logical operators: join, project, select etc. These operators are "logical" because each is agnostic about the algorithm used to implement it. (e.g., the logical operation join can be implemented with, say, a hash join or sort-merge join).

Another common query-rewriting strategy is to transform a nested query into an equivalent join query, as is usually possible. The importance of this transformation is that it prepares the query for the next step by putting it into a form for which a wealth of further optimizations exist. Join processing has been widely studied, so most optimizers are capable of doing it well.

A Generic Logical-Plan Language

The invention to be described below can be applied to any query optimizer that generates a logical plan distinct from the physical plan. Languages for expressing logical plans are varied, but all share some manifestation of the following key operations, which we will refer to in explaining an embodiment of the invention:

a. Join(p) represents a class of physical plan operators that pair records from separate tables that together satisfy the correlating predicate, p. Example plan operators in this class include hash join, sort-merge join and indexed nested-loop join. Typically, join is expressed as a binary operator and joins of n tables are expressed with n–1 binary joins.

b. Select(p) represents a class of physical plan operators that retrieve (from, e.g., disk) table records that satisfy the predicate p. Example plan operators in this class include index scan and file scan.

c. Aggregate (GrpAtts, AggAtt, AggFun) represents a class of physical plan operators that group records from a relation and then apply some aggregate function to produce one record from each group. The parameter GrpAtts is the set of grouping attributes from the input relation such that records with the same values for all of these attributes are in the same group. The parameter AggAtt is the attribute over which aggregation takes place. AggFun names the aggregate operation (e.g., MAX, MIN, SUM, AVG or COUNT) applied to each group. Example operators in this class include hash aggregation and single-pass aggregation.

d. Sort (AttList, OrderList) represents a class of physical plan operators that sort the records of a relation. The parameter AttList is a list of n attributes, Att1, . . . , Attn from the relation on which sorting takes place. (Att1 is the primary sort order, Att2 is the secondary sort order, etc.) OrderList is a list of n qualifiers that indicate whether the sort over the corresponding attribute is in ascending (ASC) or descending (DESC) order.

A typical logical plan produced by any query optimizer is an operator tree that, as the FIG. 2 example shows, has the following characteristics:

1) Select (σ) operators at the bottom: A common query-plan-evaluation strategy is to "push selections" as close to the plans' leaves as possible so as to minimize the amount of data that must be processed by the rest of the plan.

2) Join ((⋈)) operators in the middle: Once the input relations to joins are restricted with select operators, the n–1 binary joins required to join n tables are performed in some order on the restricted relations.

3) Aggregate (G) and Sort (S) operators at the top: Once the join result for the query has been produced, the result can be grouped and aggregated and, if necessary, sorted.

Physical-Plan Generation

A logical plan is then transformed into a physical plan by mapping each logical operator to physical plan operator that is used to implement it. The process of logical-to-physical-plan mapping is typically based on cost-based decisions and is briefly described next.

Given a query q, cost-based query optimization follows the following three steps to produce an access plan for q:
1. The optimizer applies some heuristics to generate a set of candidate access plans, each of which could be used to evaluate q.
2. A "cost model" is used to estimate the cost of each candidate access plan. A cost model is a set of formulas that rely on statistical information about data contained in the database to predict the cost of an access plan operation. Typical statistics that determine cost include the cardinality of a relation, the range and distribution of values for a given attribute, and the size of indexes over attributes on a table. Costs are sometimes measured in estimated time to evaluate the query, or in a more coarse-grained fashion (such as the estimated number of disk I/O's required to evaluate the query).
3. Given the set of candidate access plans and their estimated costs, the query optimizer chooses the least expensive among them to evaluate.

For row-store systems, query optimization typically focuses on two concerns that are reflected in the candidate access plans considered for a given query:
1. Determining the indexes to use to evaluate the query, and
2. Determining the order in which to evaluate the joins, and the join algorithm (hash-join, sort-merge, index nested loops etc.) for each.

Join Processing

For queries with joins of at most two tables, index selection effectively determines the candidate access plan, and for queries with more-complex joins, index selection determines the sub-plans that generate inputs to the joins in candidate access plans.

Now, data-warehouse products are capable of creating and using materialized views. Materialized views are typically used to store materialized aggregates or rollups on popular dimensions. Although some materialized views contain computed entries, such as averages, some contain only entries that can be found in the database's logical tables. We refer to materialized views of the latter type as "projections." For a column store that stores overlapping projections in varying sort orders, the primary concern of query optimization (analogous to concern #1 for row stores) is choosing the projections used to evaluate the query. Therefore, the sort orders in which columns are stored heavily influence the cost of evaluating the query.

For a query with more than two joins, the optimizer must determine the best order for evaluating them. Join processing in relational databases proceeds by examining possible join orders and comparing their expected costs relative to a cost model. We call this step join enumeration. A join of n tables is processed by applying a binary join operator n−1 times. Thus, a join-evaluation order can be represented as a binary tree in which each interior node is a join operator, and each leaf node is a base relation. The left argument to the join is called the outer relation, and the right argument is called the inner relation to reflect the role that they play in the natural looping structure of join algorithms.

The most expensive phase of query optimization is the join-enumeration phase. Because join operators are binary, there are $O(n!*C_n)$ different join orders that could be considered, given n tables to be joined. Here, $C_n$ refers to the $n^{th}$ Catalan number, which is equivalent to $2n!/((n+1)!*n!)$ for $n>=0$. Note that $O(n!*C_n)$ is an exceptionally fast-growing function, as evidenced by the following table of values of both factors for selected values of n:

| n | n! | $C_n$ |
|---|---|---|
| 1 | 1 | 1 |
| 5 | 24 | 14 |
| 10 | 362880 | 4862 |
| 15 | 87178291200 | 2674440 |
| 20 | 121645100408832000 | 1767263190 |

It is impractical to assess that many plans for all but trivial values of n, so a query optimizer must somehow prune the space of join orderings that are considered. A good query optimizer is therefore one that can so prune this search space as to ensure that the remaining plan set includes good orderings. Given a cost model that is reasonably accurate, a query optimizer can exhaustively search that plan set to find good plans.

There is a fundamental tradeoff between the time spent in producing an optimized query plan and the quality of the result. For complex queries, the search space that could be explored by the optimizer is potentially huge. Exhaustively enumerating this entire space may take so long as to be prohibitive. Therefore, it is common for optimizers to limit the search space in some way. In fact, the IBM DB2 optimizer ("IBM Universal Database for Linux, Unix, and Windows," Product Manuals, http://www-306.ibm.com/software/data/db2/udb/support/manualsv7.html) currently gives the user a choice over ten different optimization levels. Choosing a lower level restricts the amount of effort that the optimizer will expend. By choosing an optimizer level the user can decide how thoroughly the space of possible plans should be explored. This choice may be based on the perceived expense of the query or on how many times the query will be executed.

The state of the art in space-pruning for join enumeration can be summarized as follows:
1. Left-Deep Trees Only: A left-deep join tree (illustrated in FIG. 3) is one whose right branches always consist of base relations (i.e., named relations stored on disk). Therefore, restricting to just left-deep trees the search space of join orderings considered is a reasonable way to prune the join search space; a left-deep join plan ensures that intermediate join results do not have to be materialized (i.e., written to disk). Instead, they can be pipelined directly into the next join operator.

Even within the space of left-deep plans, the number of possible join orderings is large. Suppose that a given query involves a join of three tables A, B, and C. This query could be evaluated as any of the following left-deep trees: (A join B) join C, (B join A) join C, (A join C) join B, (C join A) join B, (B join C) join A, and (C join B) join A. The complexity of join enumeration is reduced from $O(C_n)$ to $O(n!)$ by restricting plans under consideration to those that are left-deep. While such a restriction reduces complexity significantly, it still leaves a very large number of join orderings to consider.
2. Dynamic Programming: Dynamic programming is a standard algorithm-design technique invented by Richard Bellman in 1953 for solving certain problems that exhibit overlapping subproblems (i.e., subproblems that can be reused several times in solving the problem as a whole).

The effect of dynamic programming is to reduce the size of the examined search space by ignoring plans that, by virtue of their similarity to already considered plans, are known not to be optimal. As an example, consider the following left-deep join plans that could be considered in processing a join of four relations A, B, C and D:

(1) ((A JOIN B) JOIN C) JOIN D
(2) ((B JOIN A) JOIN C) JOIN D
(3) ((A JOIN B) JOIN D) JOIN C
(4) ((B JOIN A) JOIN D) JOIN C

Suppose than an optimizer evaluates plans (1) and (2) and uses the cost model to determine that plan (1) is less expensive than plan (2). In this event, it must be the case that (A JOIN B) is less expensive to evaluate than (B JOIN A), because this is the only difference between the two plans. Given this inference, there is no need to evaluate plan (4), because plan (3) must be less expensive to evaluate. Thus, the effect of dynamic programming is to dynamically prune the search space to remove plans from consideration for which non-optimality can be inferred from intermediate results of the search.

Applying dynamic-programming techniques to left-deep join enumeration reduces search complexity from $O(n!)$ to $O(2^n)$ (i.e., to exponential complexity). IBM's System R Optimizer (P. Selinger, M. Astrahan, D. Chamberlin, R. Lorie, and T. Price, "Access Path Selection in a Relational Database management System," in *Proceedings of the ACM SIGMOD Conference on the Management of Data*, Boston, Mass., May, 1979) was the first to use dynamic programming in the context of left-deep join trees. Dynamic programming is used here as an efficient way to enumerate and explore query costs. Again, this reduces complexity significantly, but it still leaves a large number of join orderings to consider, as the following table listing $2^n$ for selected values of n demonstrates:

| n  | $2^n$   |
|----|---------|
| 1  | 1       |
| 5  | 32      |
| 10 | 1024    |
| 15 | 32768   |
| 20 | 1048576 |

Common wisdom is that, with dynamic programming and the left-deep restriction on the search space, a query optimizer can exhaustively examine join orderings for queries consisting of twelve to fifteen tables within a reasonable time frame. For any query that targets more tables than this, the optimizer will need to time out before the search space has been examined exhaustively and to select the best plan seen before it timed out. Thus, the greater the number of tables in the query beyond, say, fifteen, the closer the query optimizer comes to being random in its join-order selection. In short, a serious limitation of state-of-the-art query optimization lies in its inability to scale to the large numbers of tables that queries for data-warehousing applications commonly target.

An alternative join-enumeration strategy involves considering all join plans rather than just those that are left-deep. Join plans that are not just left-deep or right-deep are "bushy" join plans, which FIG. 4 illustrates. A bushy join plan allows any inner (right) relation to be a non-base relation. These trees are often said to "allow composite inners," in distinction to left-deep plans for which all inners are base tables.

Ono and Lohman ("Measuring the Complexity of Join Enumeration in Query Optimization," *Proceedings of the 16th VLDB Conference*, Brisbane, Australia, Aug. 13-16, 1990) showed that pruning non-optimal plans dynamically by using a strategy similar to dynamic programming reduces the space of bushy plans that needs to be considered from $O(n!{}^*C_n)$ to $O(3^n)$. For large numbers of relations, this space is very large; the number of possible bushy join plans for seven tables is 665,280, for example. This suggests that any attempt to evaluate such a plan space should employ a very lightweight approach.

Still, such plans are sometimes better than any of the left-deep plans. Such cases can arise when several of the joins are highly selective. Consider a query that joins four large tables A, B, C, and D. Suppose that the join predicates are A.X=B.X, C.Y=D.Y, and B.Z=C.Z, that the first two are very selective (produce small results), and that the third is not. Then a bushy join plan is likely superior to any left-deep plan, because it will properly take advantage of the smaller intermediate results to make the top join very cheap.

Vance and Maier ("Rapid Bush Join-Order Optimization with Cartesian Products," Bennet Vance and David Maier, *Proceedings of the 1996 ACM SIGMOD International Conference on Management of Data*, Montreal, Quebec, Canada, Jun. 4-6, 1996) considered relaxing the left-deep-join-tree assumption by allowing bushy plans in the search space. They suggested an efficient method for enumerating bushy plans.

SUMMARY OF THE INVENTION

We have developed a way of generating logical access plans for queries over data warehouses that tends to be scalable and considers a search space that is not in general restricted only to left-deep join trees. The invention finds its principal but not exclusive application in determining access plans for queries that, when applied to the databases that they target, define a plurality of independent snowflake schemas. In accordance with the invention, the plan generator computes, separately for each of the independent snowflake schemas, a constituent logical access plan for obtaining from that schema's tables a record set that includes the data requested by the query from those tables. Additionally, the plan generator determines a plan for obtaining the query's results from the record sets that will be produced by executing the "subplans" thus computed, and this operation may, for example, be the traditional dynamic-programming join-ordering algorithm. So the space of plans that is considered depends on the query graph's topology. But the operation differs from that of, e.g., Vance and Maier in that the set of allowed bushy plans is limited in accordance with the relationships among the fact tables in the query.

This approach to plan generation can scale to many more tables than the state-of-the-art approach does. In essence, this is because it partitions the set of tables for which a plan must be constructed, and the record sets generated by executing the subplans for the different partitions' queries are treated as the table inputs to the final plan-generation operation. So, if every partition consisted, for example, of five to six tables, this approach could in a reasonable amount of time generate a good plan for queries of seventy-five tables or more.

In some embodiments, the approach used to determine each of the constituent plans is "greedy" in the sense that the criterion used to select tables to be joined at a given stage in the query's execution is independent of selections made for any subsequent stage. Use of the resultant "lightweight" plan-selection operations contributes to scalability.

To design each constituent, snowflake-schema-based plan, some embodiments will nest an operation they use to design plans for simple star schemas. This approach begins by identifying each of the snowflake schema's dimension tables that is qualified by one or more further dimension tables of which none is so qualified. Each table thus identified is then treated as the root of a simple star schema—i.e., its incoming edge is temporarily ignored—and the plan-generation technique applicable to simple star schemas is applied to the resulting schema. If that qualified dimension table itself qualifies a further dimension table, the record set that will result from the just-designed plan's execution is then treated as a dimension table in a star schema that results from ignoring the further dimension table's incoming edge, and a plan is designed for that star schema. This continues until the snowflake schema's fact table is qualified only by dimension tables that are not further qualified or that are the roots of snowflake schemas for which plans have been designed, and the star-schema plan-design technique is applied to the star schema that the fact table forms with those unqualified dimension tables and the record sets that result from executing the plans designed for the lower-level snowflake schemas.

The invention works particularly well on column-store databases. As will be seen below, it readily lends itself to taking advantage of materialized views that the database may provide, particularly materialized views that are pre-computed joins (as opposed to pre-computed aggregates). A join materialized view has the advantage that it is very general and can be used to process a large number of queries that use that join. With star schemas, a query will contain as many joins as there are required dimensions. This could be a fairly large number. Eliminating them from the query-processing cost is a big advantage. But materializing the join of two or more relations conceptually creates a wide row, and a row store would have to store these wide tuples in each disk block and thereby exacerbate the problem of having to read more data than a given query might need. In contrast, the wide tuple does not present such a problem in a column store.

BRIEF DESCRIPTION OF THE DRAWINGS

FIG. 9 depicts a sample database schema used to illustrate how the illustrated embodiment operates.

FIG. 10 depicts an example query used to illustrate how the illustrated embodiment operates.

FIG. 11 is a diagram of the partitioning results produced by the illustrated embodiment in response to the example schema and query.

FIG. 13 sets forth the dimension subqueries that the illustrated generates in response to the example schema and query.

FIG. 14 sets forth the anchor subquery that the illustrated embodiment generates in response to the example schema and query.

FIG. 16 depicts example projections of the FIG. 9 schema's tables.

FIG. 17 is a diagram of the query that the illustrated embodiment determines for FIG. 13's first partition if FIG. 16's projections are available.

FIG. 18 is a diagram of a non-snowflake-forest schema.

FIG. 19 is a diagram that illustrates how to treat the schema of FIG. 18 as a snowflake-forest schema so as to employ the illustrated embodiment on it.

DETAILED DESCRIPTION OF AN ILLUSTRATIVE EMBODIMENT

Figure 1:
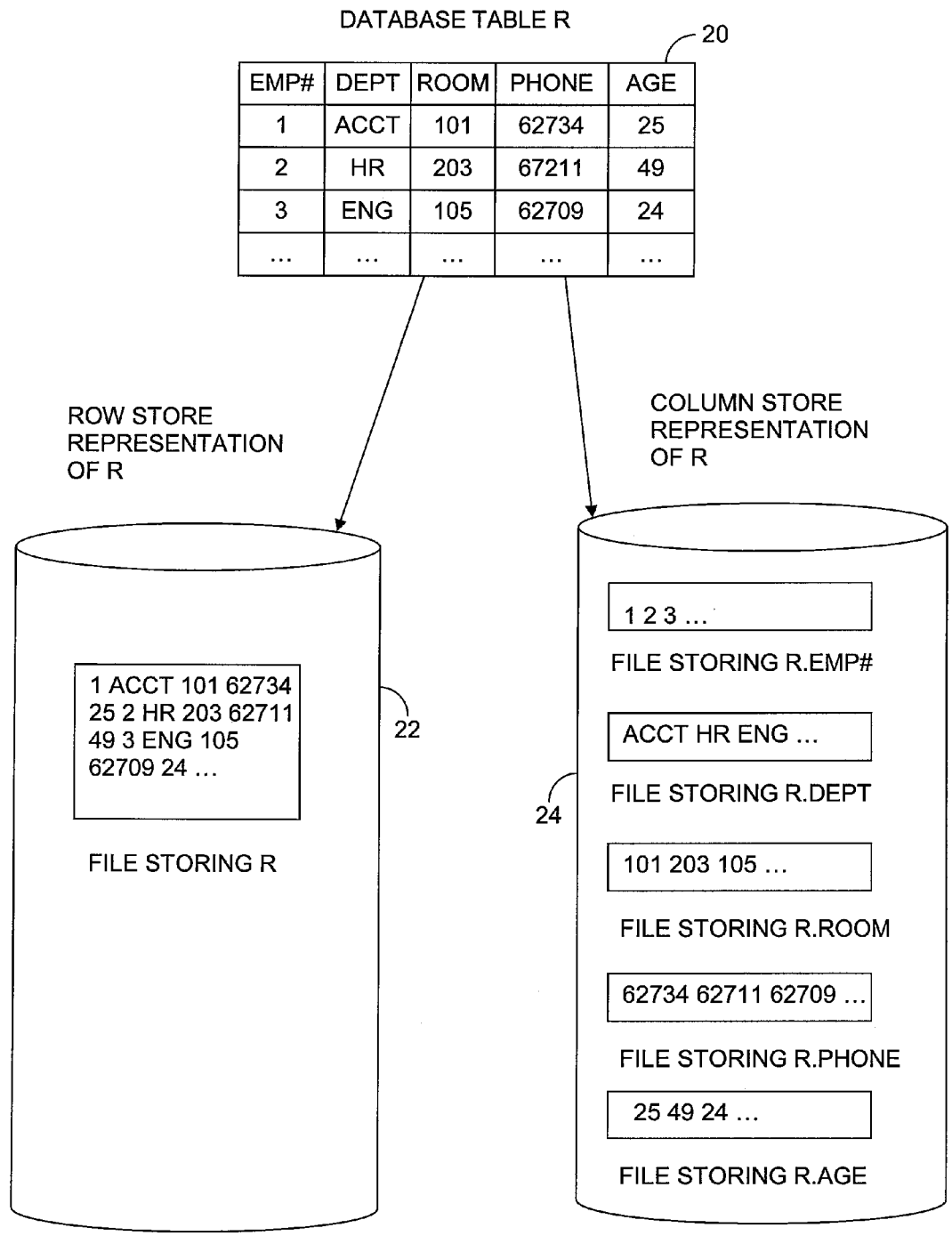
FIG. 1, previously discussed, is a block diagram that illustrates row- and column-store layouts for a database.
Figure 2:
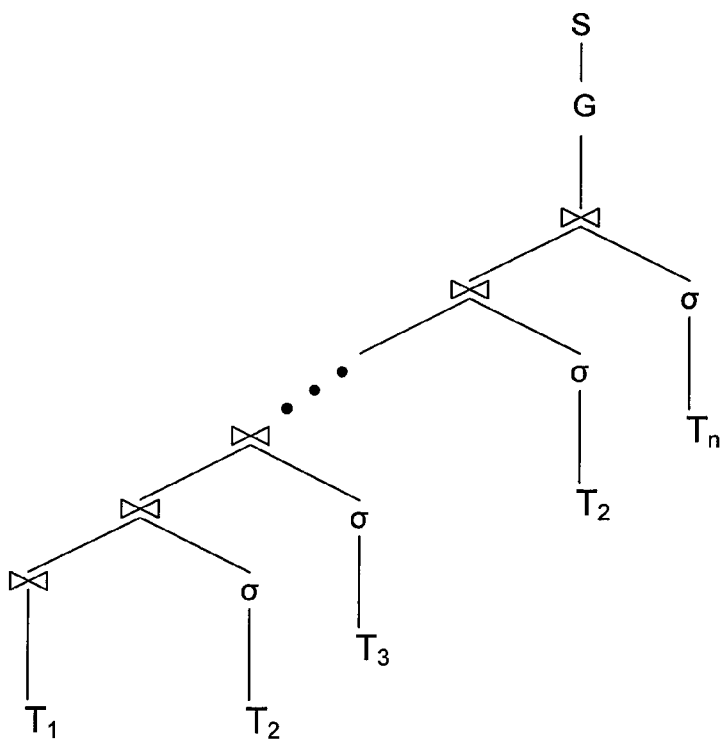
FIG. 2, previously discussed, is a graph that illustrates query nesting FIG. 3, previously discussed, depicts a left-deep join tree.
Figure 3:
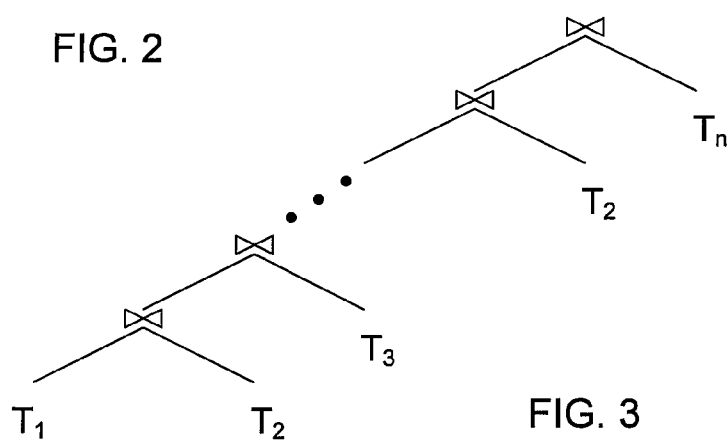
Figure 4:
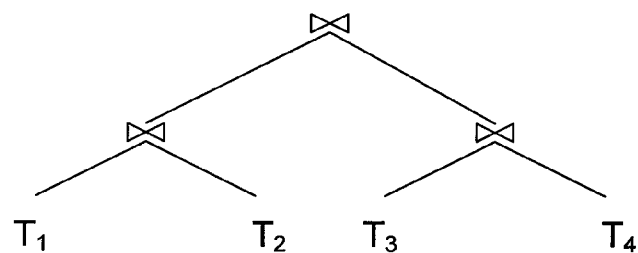
FIG. 4, previously discussed, depicts a bushy join tree.
Figure 5:
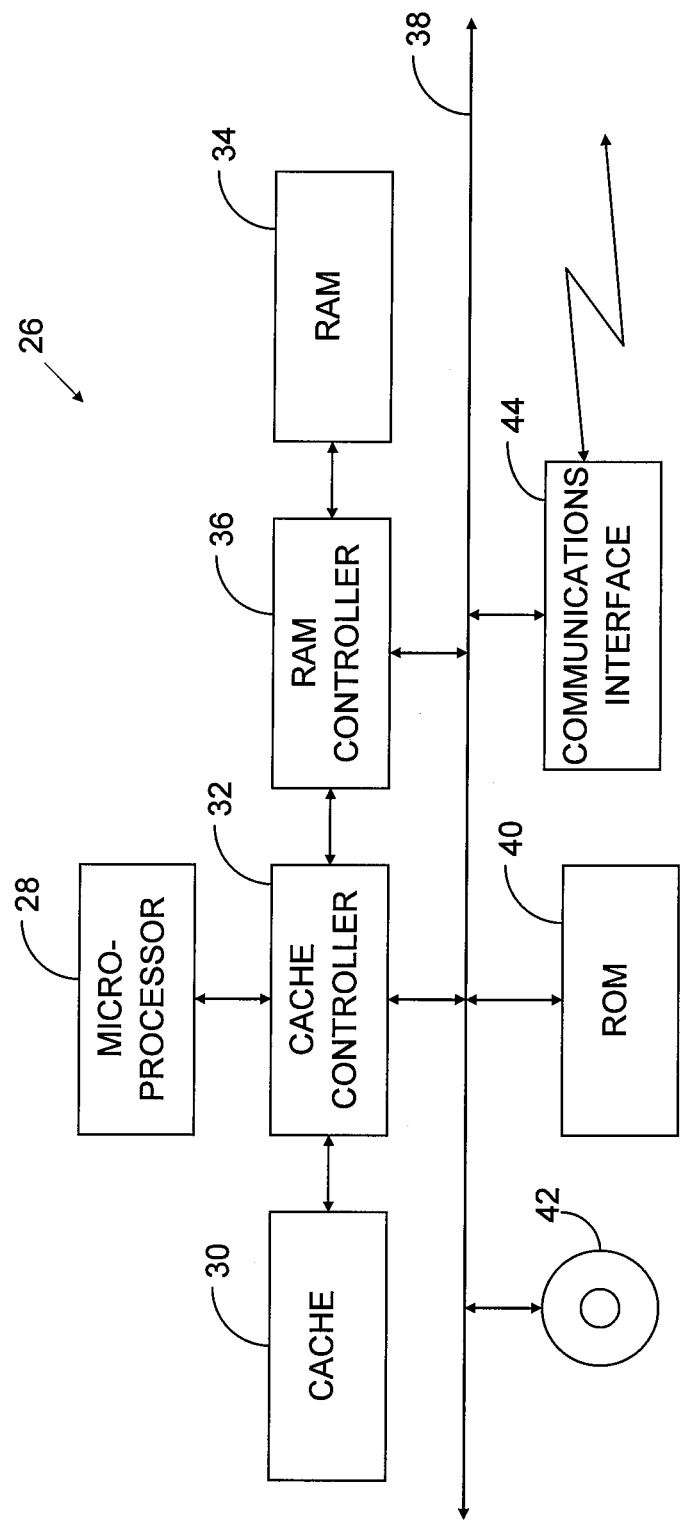
FIG. 5 is a block diagram of one type of computer system that can be used to implement the present invention's teachings.

The present invention's teachings are applicable to a wide range of database systems implemented in essentially any type of computer system. An example is the computer system that FIG. 5 depicts. That drawing's computer system 26 includes a microprocessor 28. Data that the microprocessor 28 uses, as well as instructions that it follows in operating on those data, may reside in on-board cache memory or be received from further cache memory 30, possibly through the mediation of a cache controller 32. That controller can in turn receive such data and instructions from system read/write memory ("RAM") 34 through a RAM controller 36 or from various peripheral devices through a system bus 38. Alternatively, the instructions may be obtained from read-only memory ("ROM") 40, as may some permanent data.

The processor may be dedicated to DBMS operations, or it may additionally execute processes directed to other functions, and the memory space made available to DBMS operations may be "virtual" in the sense that it may actually be considerably larger than the RAM 34 provides. So the RAM's contents may be swapped to and from a system disk 42, which in any case may additionally be used instead of a read-only memory to store instructions and permanent data. The actual physical operations performed to access some of the most-recently visited parts of the process's address space often will actually be performed in the cache 30 or in a cache on board microprocessor 28 rather than in the RAM 34. Those caches would swap data and instructions with the RAM 34 just as the RAM 34 and system disk 42 do with each other.

In any event, the ROM 40 and/or disk 42 would usually provide persistent storage for the instructions that configure such a system to optimize query execution in the manner that will be explained below, but the system may instead or additionally receive them through a communications interface 44, which receives them from a remote server system. The electrical signals that typically carry such instructions are examples of the kinds of electromagnetic signals that can be used for that purpose. Others are radio waves, microwaves, and both visible and invisible light.

Figure 6:
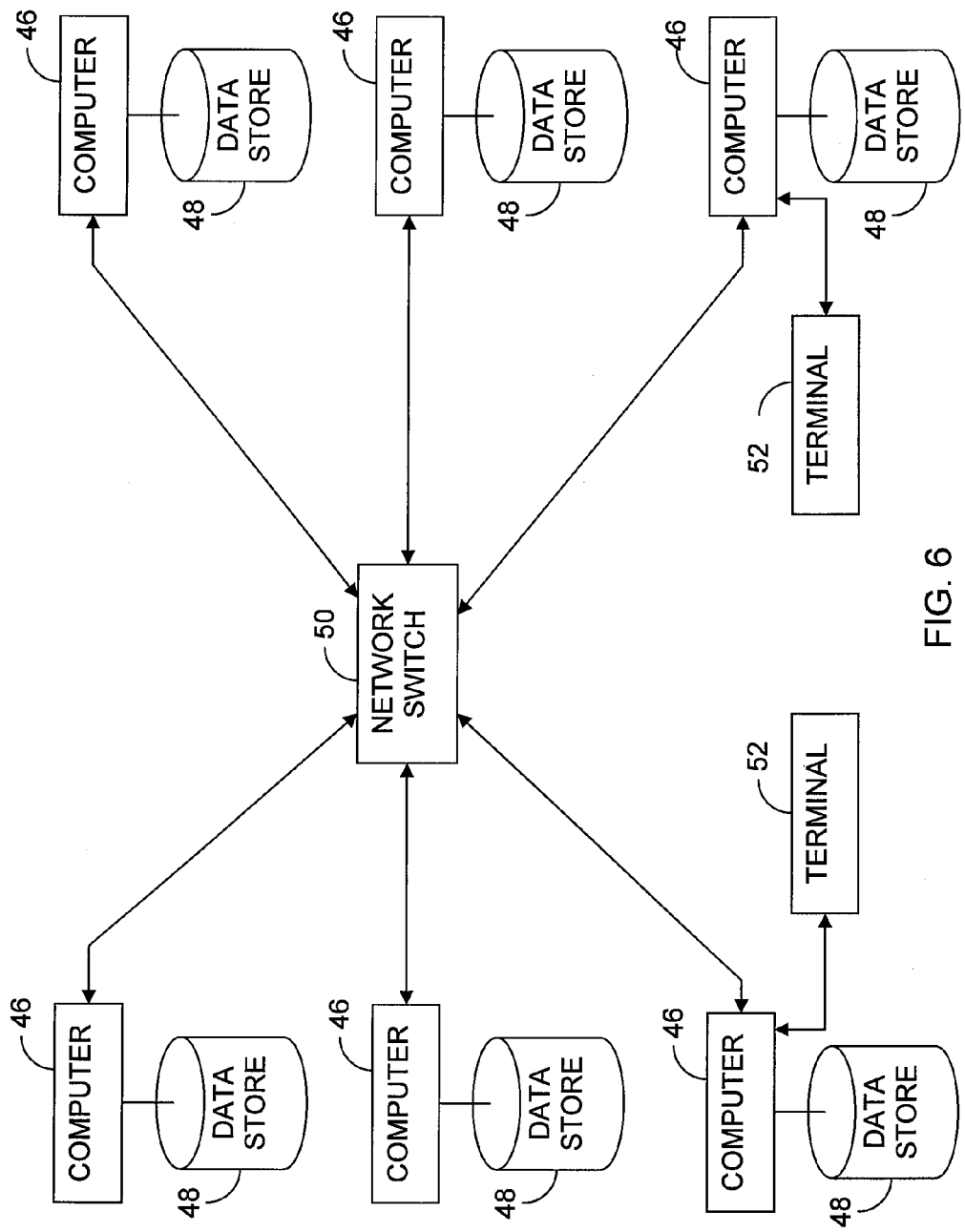
FIG. 6 is a block diagram of another type of computer system that can be used to implement the present invention's teachings.

Of course, few computer systems that implement the present invention's teachings will be arranged in precisely the manner that FIG. 5 depicts. Moreover, it will be typical for the computer system actually to be implemented, as the example that FIG. 6 depicts is, in a plurality of networked computing nodes. In that system each of a plurality of networked computers 46 has direct access to a respective storage device 48 and communicates over a network through a network switch 50 with the other computers, through which it can indirectly obtain access to the data on those other computers' storage devices. To perform a query, a user employs terminal equipment 52 such as a keyboard and monitor coupled to one of the computers to communicate with a DBMS process that is executing on that computer. That process performs the query by accessing its own storage device 48 and/or those of other computers.

Independently of whether the host system is a single-processor system or a multi-node network, it will need to determine an execution plan to use in responding to queries, and it does so in a way that will now be explained by reference to an illustrative embodiment of the invention.

As will be explained below in more detail, the illustrated embodiment operates in three phases. In the first phase, which FIG. 7's block 54 represents, it rewrites the original (typically SQL) query into an "anchor query" (defined below) and a set of (again, typically SQL) "snowflake subqueries" (also defined below). Each of the snowflake subqueries contains some disjoint subset of the tables in the original query's FROM clause, as will be explained below by reference to an example.

A snowflake subquery is so named because the primary-to-foreign-key relationships of the tables it queries define a snowflake schema. A degenerate case of a snowflake subquery is a star subquery, whose tables form a star schema.

The anchor query joins the results produced by the snowflake subqueries into a result equivalent to that produced by the original query. Taken together, query rewriting 54 transforms the original SQL query into an equivalent SQL query that consists of the anchor query, with the snowflake subqueries as the nested inputs in its FROM clause.

Figure 8:
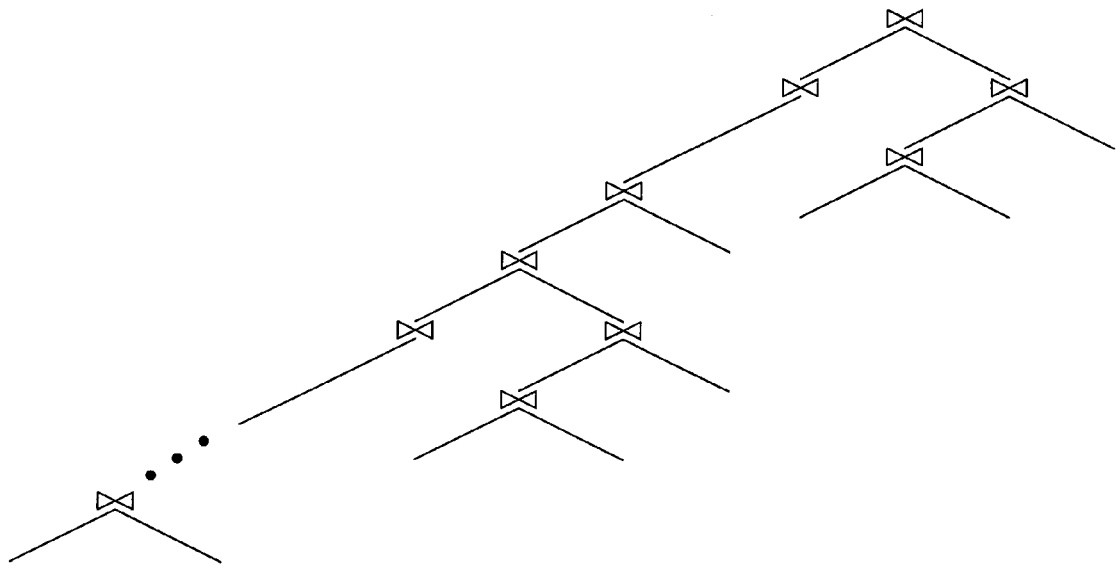
FIG. 8 is a diagram of a typical resultant join tree.

In the second phase, which block 56 represents, the optimizer uses what in the illustrated embodiment is a lightweight plan-generation algorithm to produce a respective query subplan from each snowflake subquery. In the final phase 58, the optimizer generates the final logical plan for the anchor query by using any appropriate cost-based techniques (e.g., left-deep trees and dynamic programming) but treating each record set produced by a snowflake subquery's execution as a single table. The overall result is that the optimizer is not limited to considering only one shape of join tree. It may, for instance, consider a space that comprises plans that define self-similar left-deep trees such as the one that FIG. 8 depicts. That is, it may consider left-deep trees whose right branches can lead not only to tables but also to other left-deep trees.

Figure 7:
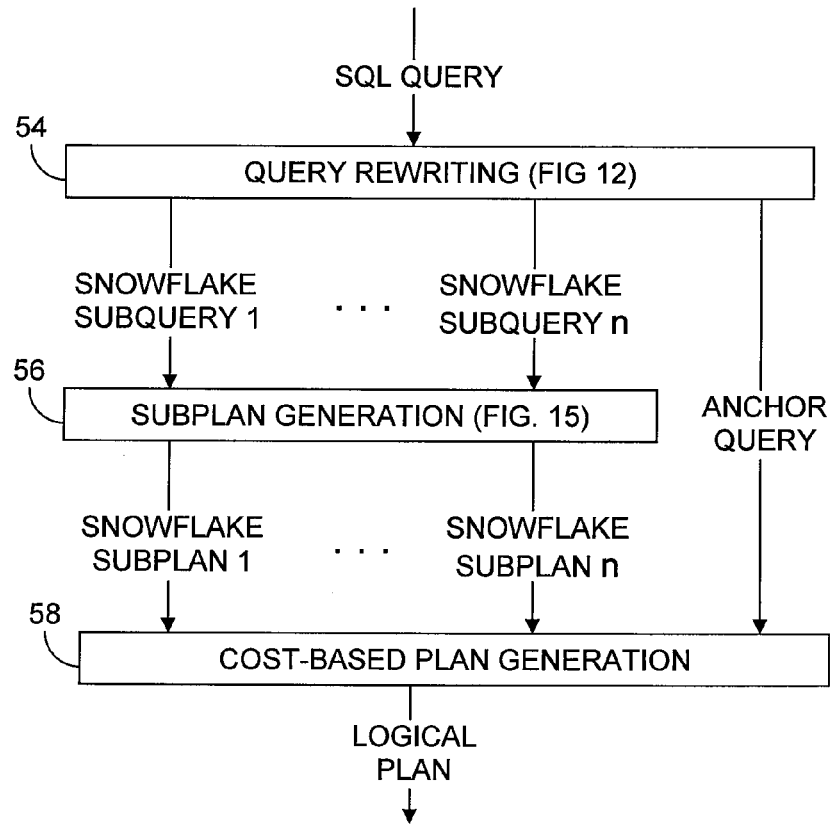
FIG. 7 is a block diagram of the high-level steps that the illustrated embodiment of the invention performs.

To illustrate the FIG. 7 approach in more detail, we present in FIG. 9 an example schema to which we will apply the illustrated embodiment. In this schema, $F_1$, $F_2$, and $F_3$ denote fact tables. For a retail chain, these tables may include tables of customer purchases (Purchases), supplier orders (Inventory), and item discounts (Specials). $D_1, \ldots, D_6$ are dimension tables. Again for a retail chain, these tables may include tables of customers (Customer), suppliers (Supplier), stores (Stores), items (Items), dates (Date), and states (State). Each table in the schema is shown with its attributes. Every fact table includes one or more attributes of the form FKi, which is a foreign key that refers to the primary key, PKi, of dimension table $D_i$.

As background, we will define a useful normal form for predicates. Attribute A of relation R is named by writing R.A. Relational operators include <, >, <=, >=, and =, and we denote them as <relop>. A predicate of the form <attribute-name><relop><attribute-name> or <attribute-name><relop><constant> is called a simple predicate. Simple predicates can be combined with Boolean operators (AND, OR, NOT) to form a complex predicate. NOT may appear only directly in front of an simple predicate (as in "NOT (R.A=6)"). Conjunctive Normal Form ("CNF") is a complex predicate that is written as a conjunction of clauses in which each clause is a disjunction of simple predicates. For example, if A, B, C, D, and E are all simple predicates, then (A OR B) AND (NOT(B) OR C OR NOT(D)) AND (D OR NOT(E)) is in CNF. It can be shown that every complex predicate can be converted to CNF.

FIG. 10 depicts a typical data-warehouse query Q over the schema of FIG. 9. For present purposes, the important features to identify in any SQL query such as this are the following:

1) Join Tables: These are the tables that appear in the FROM clause of the SQL query. For Q, these are tables $F_1$, $F_2$, $F_3$, $D_1$, $D_2$, $D_3$, $D_4$, $D_5$, and $D_6$.

2) Predicates: These are the conjoined predicates in the WHERE clause. The predicates are of three types:

Join predicates, which equate a fact-table foreign key with the associated dimension-table primary key. For query Q of FIG. 9, these are the predicates: FK1=PK1, FK2=PK2, FK3=PK3, FK4=PK4, FK5=PK5, and FK6=PK6.

Restriction predicates over attributes of the dimension tables. For query Q of FIG. 9, the restriction predicates are G=10, H>10, J=0 and K=1.

Crossfact predicates, which are predicates that compare fact-table attributes. For query Q of FIG. 9, the crossfact predicates are A1=B1 and B1=C1.

FIG. 11 is a graph-based representation of FIG. 10's query Q: the graph's nodes represent Q's nine join tables, and there is an edge from table T to table U if T contains a foreign key that one of Q's join predicates compares with U's primary key. Note that $F_1$, $D_1$, and $D_2$ form a very simple "star schema" (a degenerate case of a snowflake schema). Similarly, $F_2$, $D_3$, $D_4$, and $D_5$ form a star schema, as do $F_3$ and $D_6$. We refer to the entire schema, consisting of unconnected snowflake-schema trees, as a snowflake forest.

C. Algorithm Steps

Step 1: Query Rewriting

Figure 12:
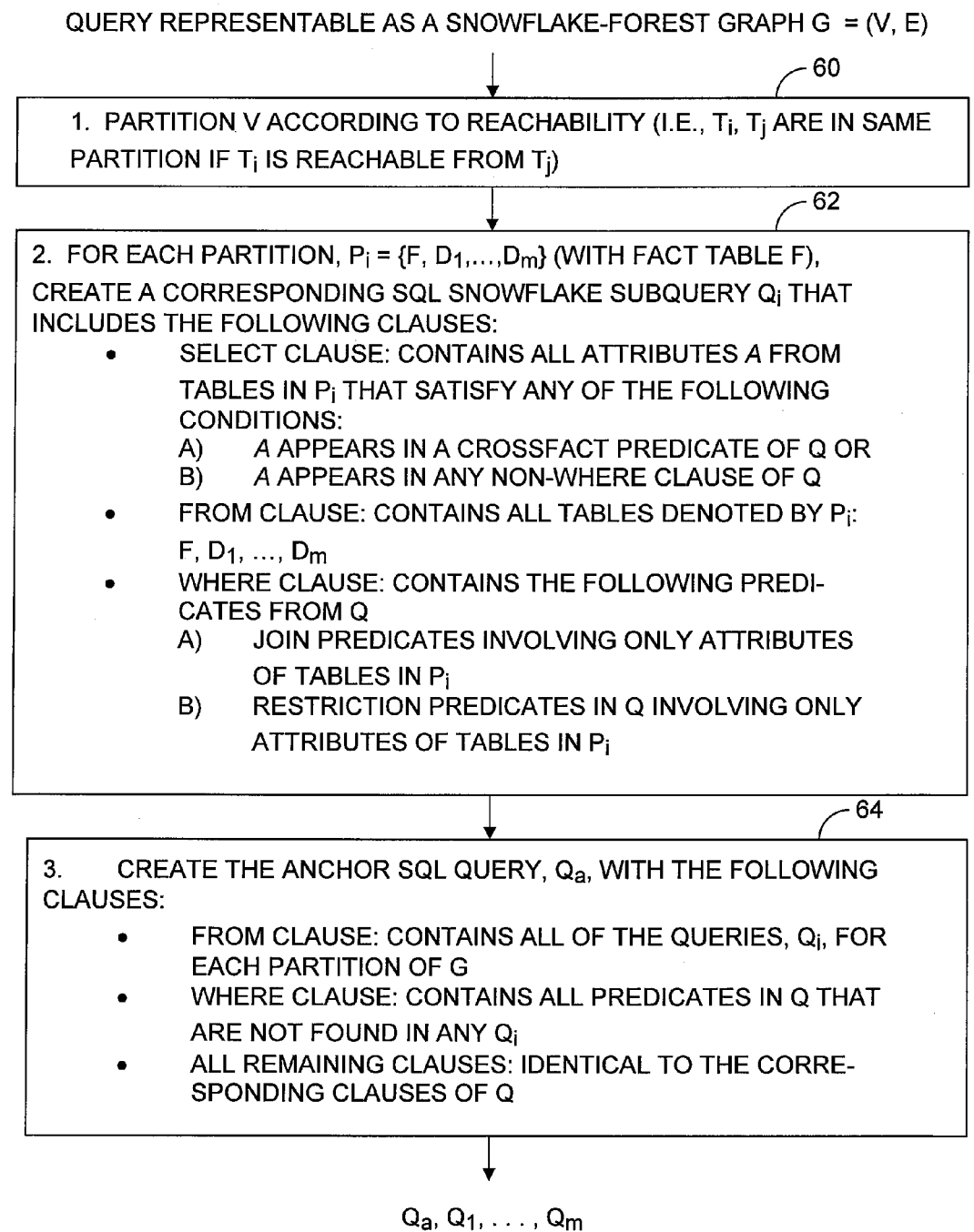
FIG. 12 sets forth pseudocode for one of the operations of FIG. 7.

The illustrated optimization algorithm's query-rewriting step represented by FIG. 7's block 54 takes a FIG. 11-*type* snowflake-forest query as input. The output of this step is a nested SQL query that is equivalent to Q. FIG. 12 depicts in pseudocode the algorithm (hereafter referred to as "Algorithm Rewrite") that the illustrated embodiment uses to perform FIG. 7's query-rewriting operation 54.

The FIG. 12 algorithm's first step, which block 60 represents, partitions the snowflake-forest query graph into its snowflake-query components. When that step is applied to the query of FIG. 10, it results in the following three partitions, which reflect the organization described above by reference to FIG. 11:

Partition 1={$F_1$, $D_1$, $D_2$}
Partition 2={$F_2$, $D_3$, $D_4$, $D_5$}
Partition 3={$F_3$, $D_6$}

Note that this operation requires that the optimizer recognize primary-key/foreign-key relationships. This is possible because the database-designing user ordinarily declares those relationships in order to enable the DBMS to enforce referential integrity. If the designer fails to declare some such relationship, the illustrated optimizer will still work, although not as effectively. If the relationship depicted in FIG. 9 between FK1 in $F_1$ and PK1 in $D_1$ had not been declared, for example, the optimizer would place $F_1$ and $D_1$ in separate partitions rather than in the same one, but, as will become apparent as the description proceeds, a valid search strategy would nonetheless result.

As FIG. 12's block 62 indicates, each partition is then used to create a snowflake subquery. When this step is applied to the FIG. 10 query, the result is FIG. 13's three snowflake subqueries $Q_1$, $Q_2$, and $Q_3$.

Finally, the anchor query that connects the snowflake subqueries is constructed, as FIG. 12's block 64 indicates. In the example, the resultant anchor query is the one that FIG. 14 depicts.

Step 2: Snowflake Subquery Plan Generation

Having thus completed the query-rewriting operation that FIG. 7's block 54 represents the optimizer enters its second, block-56 phase, in which it uses a "lightweight" algorithm to generate a plan for each snowflake subquery. (This algorithm is lighter in weight than, e.g., state-of-the-art join enumeration because it applies a greedy heuristic to choose a join order, with the result that the amount of time required to make the choice increases only linearly with the number of projections considered for the query, and that number is less than or equal to the number of materialized views actually available.)

To explain this algorithm we first assume that its snowflake-subquery inputs are all simple star subqueries, as the example subqueries $Q_1$, $Q_2$, and $Q_3$ all are. We will thereafter explain how the algorithm as thus described is extended to handle snowflake subqueries that are not necessarily star subqueries.

We also digress briefly to note that there is a large volume of work (e.g., Baralis, Paraboschi, Teniente, "Materialized View Selection in a Multidimensional Database," in *Proceedings of the 23rd VLDB Conference*, Athens, Greece, 1997, and H. Gupta and I. S. Mumick, "Selection of Views to Materialize under a Maintenance-Time Constraint," *International Conference on Database Theory* (ICDT), 1999) that investigates how to decide which aggregate views should be materialized and therefore which views to use in processing a query.

The snowflake-subquery plan-generator algorithm (hereafter called "Algorithm Snowflake") that will now be described by reference to the pseudocode of FIG. 15 takes advantage of certain materialized views. Specifically, it considers takes into account whatever projections the database's physical layout provides. Of course, it sometimes happens that there is only one projection per table (i.e., the table itself). But the algorithm takes advantage of others if they exist.

For any set of tables Ts used in a query Q, a projection P is said to cover Ts if P includes a respective column for every attribute that appears in Q and belongs to a table in Ts. But P need not include the attributes that occur only in Q's join predicates that join tables in Ts. To illustrate, consider the projections shown in FIG. 16, which include columns from FIG. 9's tables $F_1$, $D_1$, and $D_2$. Observe that:

- $PF1_a$ covers $\{F_1\}$ with respect to FIG. 10's query Q, because it includes every column of $F_1$ that appears in Q.
- $PF1_b$ covers $\{F_1, D_1\}$ with respect to FIG. 10's query Q, because it includes every column of $F_1$ and $D_1$ that appears in Q except those (FK1 and PK1) that appear in the join predicate between $F_1$ and $D_1$.
- $PF1_c$ covers $\{F_1, D_2\}$ with respect to FIG. 10's query Q, because it includes every column of $F_1$ and $D_2$ that appears in Q, except those (FK2 and PK2) that appear in the join predicate between $F_1$ and $D_2$.
- $PD1_a$ covers $\{D_1\}$ with respect to FIG. 10's query Q because it includes every column of $D_1$ that appears in Q.
- $PD2_a$ and $PD2_b$ both cover $\{D_2\}$ with respect to FIG. 10's query Q, because both include every column of $D_2$ that appears in Q.

An Example Cost Model: FIG. 15's snowflake-subquery plan-generation algorithm assumes the existence not only of some set of projections but also of a cost model that is used to choose among those projections. Typically, a cost model includes a set of formulas that can be used to map any query plan to its expected cost. By applying these formulas to all candidate plans, the plan can be ranked from least to most expensive, and plan choices can be made accordingly. To keep the explanation simple, we present the cost model below in terms of the decision procedure it implies rather than as a set of formulas.

To understand this cost model, we need to introduce one additional concept. Predicates in a SQL WHERE clause are applied to a set of records. Those records for which the predicate is true are returned as the result set R. A predicate that returns very few records is said to be highly selective. One measure of the selectivity of a predicate applied to a set of records S is what we refer to as a "selection coefficient," $|R|/|S|$: the lower the selection coefficient, the greater the selectivity is.

We use the simple cost model below to trace the steps of the snowflake-subquery plan-generation algorithm on an example query. It is important to note that this algorithm's applicability does not depend on the choice of actual cost model; the model described here is meant only to serve as an example.

1. Ranking Candidate Projections for the Anchor Projection: For each subquery Q's plan, a projection is chosen as the "anchor" projection, whose purpose will become apparent below. FIG. 15's block 66 represents making that choice. If only one existing projection by itself covers the fact table F in the snowflake defined by the subquery Q whose subplan is being determined, that projection is the one chosen as that subplan's anchor projection. If there is more than one such projection, we choose one of them as the anchor projection according to the following rules:

a. Choose the projection that covers the largest set $\{F, D_1, \ldots, D_k\}$ of join tables in subquery Q. In case of a tie, use rule b to break it:
    b. Choose the tying projection whose selectivity is greatest (as indicated by the smallest product of the selection coefficients of all restriction predicates over attributes in the tables covered by the projection). In case of a tie, use rule c to break it:
    c. Choose the tying projection for which the predicates over the attributes forming the projection's sort order are collectively the most selective. That is, for each projection $P_i$, compute the product of the selection coefficients of the predicates in Q that impose restrictions on any of the attributes in $P_i$'s sort order, and choose the projection whose product is the lowest. In case of a tie, use rule d to break it:
    d. Choose any tying projection that is sorted on the attributes in Q's GROUP BY clause. If no such projection exists, choose any tying projection.

2. Ranking Candidate Projection Sets for the Anchor Projection: If there is no existing projection that covers the fact table, then a set of existing projections must be chosen that, when joined, will form a projection that covers the fact table. If there is more than one candidate set, the cost model is used to choose among them. These are the example cost model's rules for choosing among them:

a. Choose the projection set whose cardinality is lowest. In case of a tie, use rule b break it.
    b. For each tying candidate projection set, compare the covering projection that would result from joining the projections in that set, and choose the set whose result would be chosen according to the above-described rules (rules 1a-d) for selecting a single anchor projection.

3. Ranking Candidate Projections to Cover a Dimension Table D: In an operation represented by FIG. 15's block 68, a projection is chosen for each of the subquery's dimension tables D that the subquery's anchor projection does not cover. If more than one projection covers dimension table D, the following rules are used to choose one of those projections as D's covering projection:
   a. Choose the projection with respect to whose sort-order attributes the query's restriction predicates are most selective. That is, for each projection $P_i$, compute the product of the selection coefficients of predicates in Q that restrict the values of any of the attributes in $P_i$'s sort order, and choose the projection whose product is the lowest. In case of a tie, break it by using rule b.
   b. Choose the tying projection whose sort order is the primary key of D. If no such projection exists, choose any tying projection.
4. Ranking Restriction Predicates: In an operation that FIG. 15's block 70 represents, a left-deep join tree is constructed for the subquery. The anchor projection is the tree's leftmost leaf. To place the dimension-table-covering-projections in the tree, restriction predicates over a single projection must be ranked. For this example cost model, is ranking will be based on the predicates' selectivities. That is, predicates will be placed from bottom to top of the query plan in ascending order of their selection coefficients.

Tracing Subplan Generation over an Example Subquery: To illustrate the FIG. 15 embodiment's application to a single one of the subqueries, we will trace it on FIG. 13's subquery $Q_1$, which was one of the subqueries produced by performing the FIG. 12 operation on FIG. 10's query Q. For this example, we assume that FIG. 16's projections are available and that the following statistics apply:

the selection coefficient of the "G=10" predicate is 0.1, and the selection coefficient of the "H>10" predicate is 0.5.

Figure 15A:
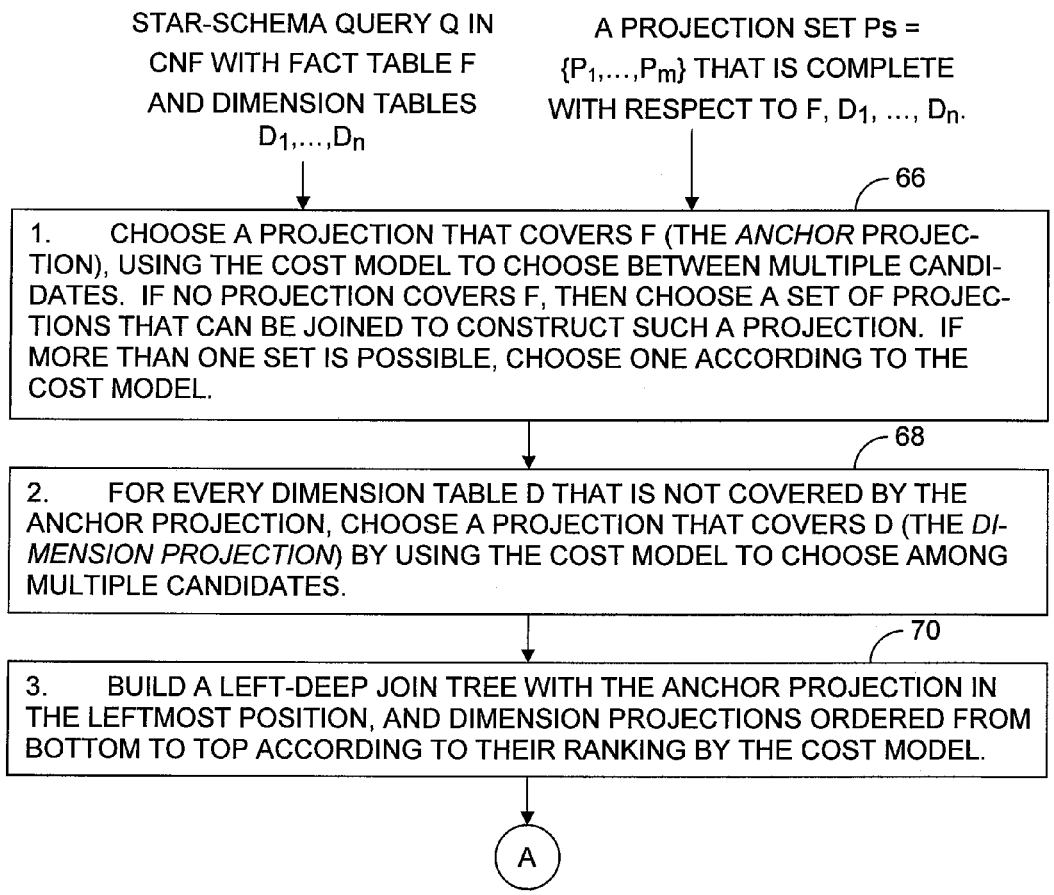
FIGS. 15A and 15B (together, "FIG. 15") set forth pseudocode for one of the operations of FIG. 7.
Figure 15B:
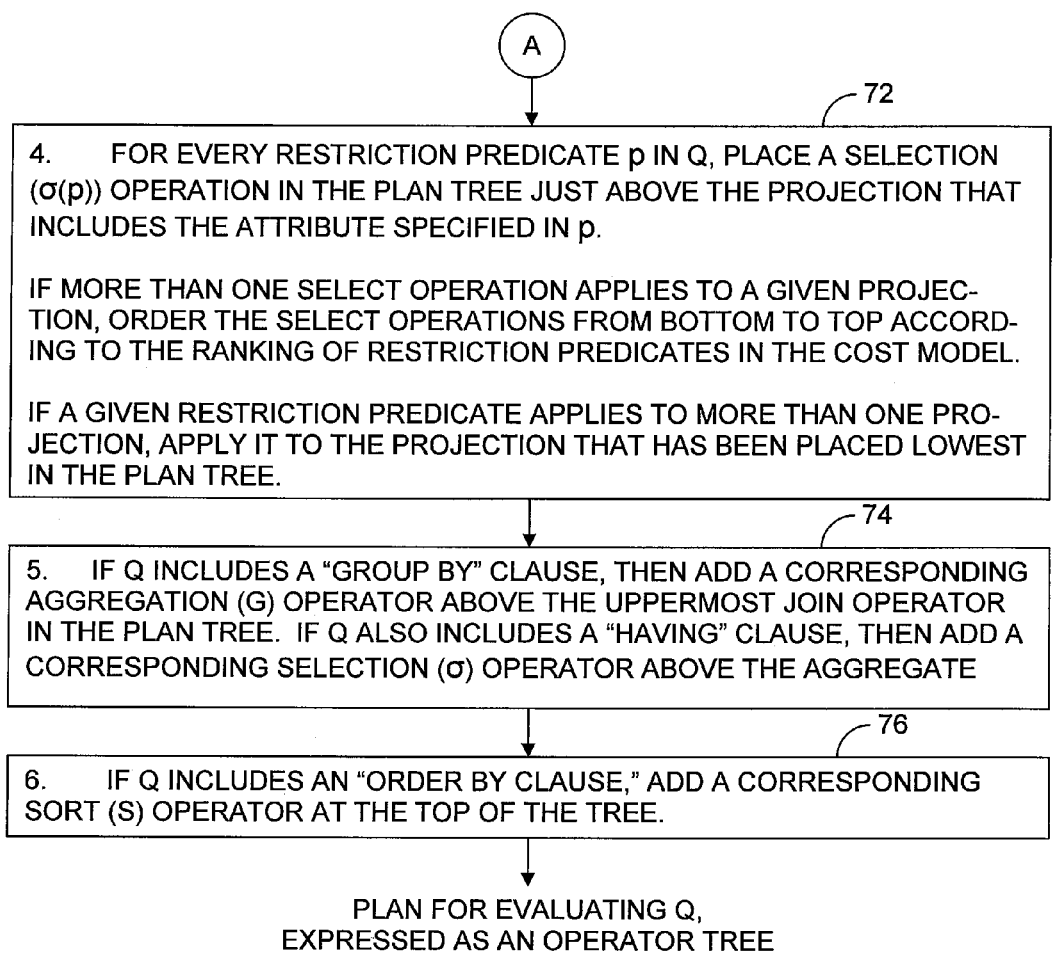

In an operation that FIG. 15's block 66 represents, an anchor projection is chosen that covers fact table $F_1$. Since projections $PF1_a$, $PF1_b$, and $PF1_c$ all cover $F_1$, they are all candidate projections. But $PF1_a$ does not additionally cover any dimension table, whereas $PF1_b$ covers $D_1$, and $PF1_c$ covers $D_2$. So, according to the example cost model's rule 1a, $PF1_a$ is eliminated from contention. This leaves $PF1_b$, and $PF1_c$, and, because of the cost model's rule 1b, $PF1_b$ is chosen; the selection coefficient of $D_1$ (which $PF1_b$ covers) is 0.1 (equal to the selection coefficient of "G=10"), whereas the selection coefficient of $D_2$ (which $PF1_c$ covers) is 0.5 (equal to the selection coefficient of "H>10").

In an operation that FIG. 15's block 68 represents, a projection is chosen to cover the remaining uncovered dimension table, $D_2$. There are two candidate projections; $PD2_a$ and $PD2_b$ both cover $D_2$. But, whereas the selection coefficient of $PD2_a$ is 1 (because Q has no restriction predicate over $PD2_a$'s sort-order attribute, PK2), the selection coefficient of $PD2_b$ is 0.5 (because the "H>10" restriction predicate restricts, with selection coefficient 0.5, the values of $PD2_b$'s sort-order attribute H). So application of the above-described cost model's rule 3a results in choosing projection $PD2_b$.

In an operation that FIG. 15's block 70 represents, a left-deep join tree is constructed with anchor projection $PF1_b$ and dimension projection $PD2_b$.

In an operation that FIG. 15's block 72 represents, a selection operation for every restriction predicate in $Q_1$ is placed just above the appropriate projection. Thus, "$\sigma_{G=10}$" is placed over $PF1_b$, and "$\sigma_{H>10}$" is placed over $PD2_b$. Since $Q_1$ includes no GROUP BY or ORDER BY clause, the operations that blocks 74 and 76 represent result in no additions to the plan, and the algorithm terminates, leaving the query plan shown in FIG. 17.

Figure 20:
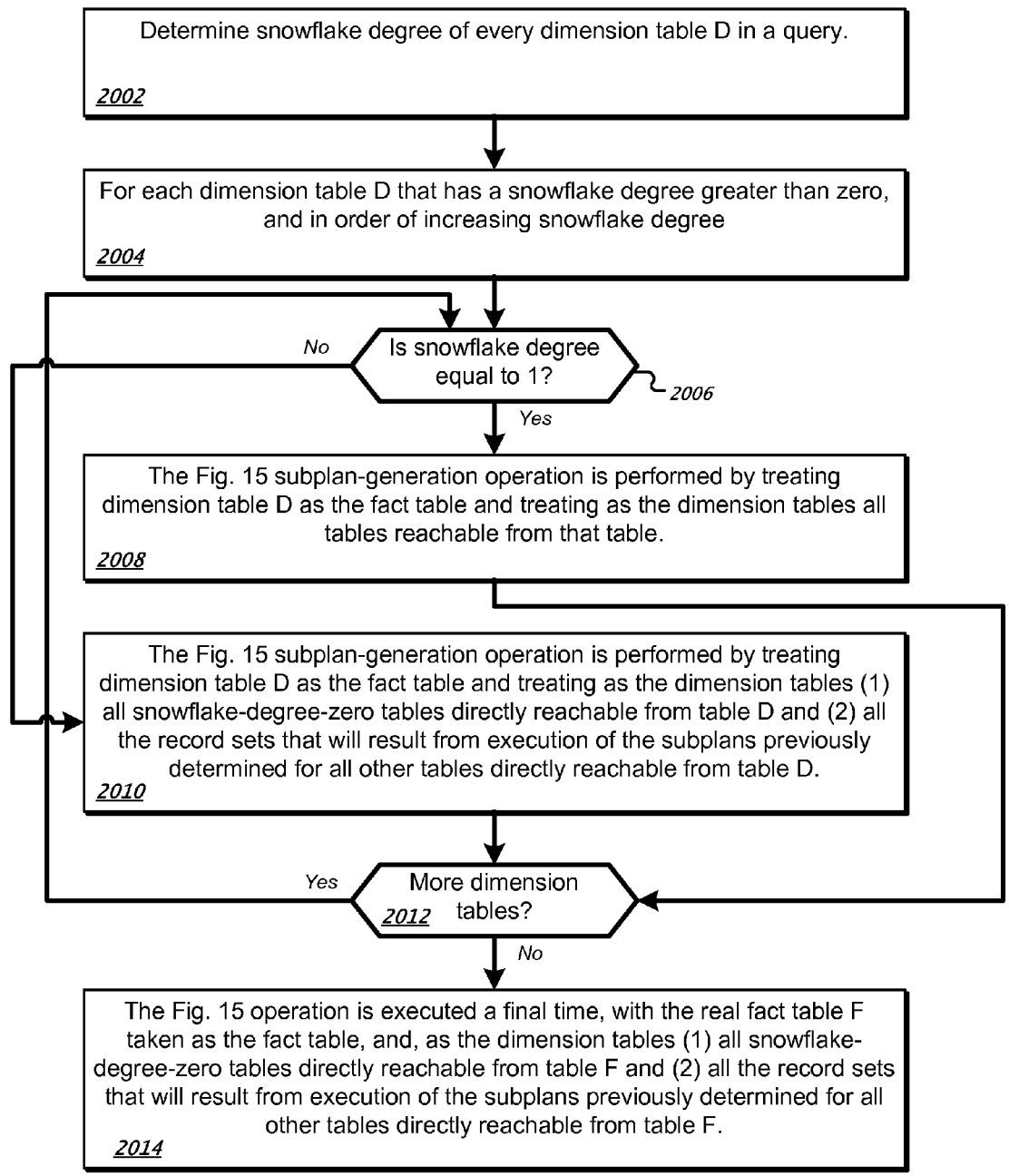
FIG. 20 is an illustration of an example extension of algorithm snowflake.

Extensions of Algorithm Snowflake: The pseudocode shown in FIG. 15 assumes that the input is a star-schema query. With reference to FIG. 20, to handle general snowflake queries, one first identifies the "snowflake degree" of every dimension table D in a query (2002), where a table D's snowflake degree in a given query is defined as the length of the longest path that starts at the table-D-representing node in that query's graph. For each dimension table D (2004) whose snowflake degree is one (2006), the FIG. 15 subplan-generation operation is performed by treating dimension table D as the fact table and treating as the dimension tables all tables reachable from that table (2008). Then, for each dimension table D whose path length is two, the FIG. 15 subplan-generation operation is performed by treating dimension table D as the fact table and treating as the dimension tables (1) all snowflake-degree-zero tables directly reachable from table D and (2) all the record sets that will result from execution of the subplans previously determined for all other tables directly reachable from table D (2010). This continues for increasingly high snowflake degrees until subplans have been determined for all dimension tables whose snowflake dimensions exceed zero (2012). Then the FIG. 15 operation is executed a final time, with the real fact table F taken as the fact table, and, as the dimension tables (1) all snowflake-degree-zero tables directly reachable from table F and (2) all the record sets that will result from execution of the subplans previously determined for all other tables directly reachable from table F (2014).

Another extension to Algorithm Snowflake allows for processing of an "almost snowflake" query, whose graph representation is a collection of directed acyclic graphs ("DAGs") rather than a collection of trees. FIG. 18 is the graphical representation of one such query. That query is not a snowflake query, because dimension table $D_1$ is shared by $F_1$ and $F_2$, and dimension table $D_6$ is shared by $F_1$ and $F_3$. To handle such queries, a simple preprocessing step replicates all nodes that are reachable through multiple distinct paths. The result of such replication is to convert an "almost snowflake" query into a snowflake query. For example, the example graph of FIG. 18 would first be modified to that of FIG. 19, where shared dimension tables $D_1$ and $D_6$ have been replicated to be tables $D'_1$ and $D'_6$, respectively, before the FIG. 15 operation is executed.

Step 3: Cost-Based Join Enumeration

The query-optimization algorithm's last step—i.e., the step that FIG. 7's block 58 represents—involves running some cost-based plan-generation algorithm on the anchor query $Q_a$ generated in the (block 54) query-rewrite phase. (For example, this step could, but need not, use the well-known approach of enumerating and costing left-deep trees by using dynamic programming.) What is important to note is that the table inputs to the cost-based optimization step are not the original tables of the input query; they are the partitions produced during the rewrite step of the optimization algorithm. Where each partition would appear in the final plan, the snowflake subplan for that partition that was produced in Step 2 of the algorithm is substituted.

As was mentioned above, a complete access plan specifies not only what logical operations are to be performed but also lower-level details such as what join algorithms to use. The system decides these details, too, and the resultant complete plan is executed to obtain the query results and generate output signals that represent those results.

Note that the complexity of cost-based plan generation has been reduced by using multi-table partitions, rather than individual tables, as the input to the plan generator. This means that instead of scaling to twelve to fifteen tables, the algorithm scales to twelve to fifteen partitions (potentially, twenty-five or tables or more, the number depending on how many tables fall in each partition). For example, whereas query Q of FIG. 10 has nine join tables, it has only three partitions, so in that example the complexity of cost-based join enumeration has been reduced by a factor of three. The present invention therefore constitutes a significant advance in the art.

What is claimed is:

1. A method comprising:
    receiving inputs that represent a query and that, applied to a database, define independent snowflake schemas in which each snowflake schema includes one or more pairs of join tables from the query;
    generating a subquery for each snowflake schema in which the subquery contains one or more join predicates that involve one or more attributes from one or more join tables of the snowflake schema;
    computing, by a computing system, for each of the generated subqueries, an access plan for obtaining from one or more tables of the subquery's snowflake schema data requested by the subquery;
    executing the access plans to obtain each subquery's results;
    generating an anchor query that joins the results produced by the generated subqueries into a result equivalent to a result produced by the query; and
    generating a logical plan for the anchor query that uses the results of the generated subqueries as table inputs of the logical plan.

2. The method of claim 1, wherein computing the access plan for a subquery in the generated subqueries comprises computing, separately for each of the one or more tables whose snowflake degree in the subquery's snowflake schema exceeds zero, a respective access plan for obtaining the data requested by the subquery from each of the one or more tables whose snowflake degree in the subquery's snowflake schema exceeds zero.

3. The method as defined in claim 1, wherein the database comprises a column store.

4. A system comprising:
    one or more processors; and
    computer readable storage comprising instructions that are to cause the one or more processors to:
        accept input signals that represent a query that, applied to the database, define a plurality of independent snowflake schemas in which each snowflake schema includes one or more pairs of join tables from the query;
        generate a subquery for each snowflake schema in which the subquery contains one or more join predicates that involve one or more attributes from one or more join tables of the snowflake schema;
        compute, for each of the generated subqueries, an access plan for obtaining from one or more tables of the subquery's snowflake schema data requested by the subquery;
        execute the access plans to obtain each subquery's results;
        generate an anchor query that joins the results produced by the subqueries into a result equivalent to a result produced by the query; and
        generate a logical plan for the anchor query that uses the results of the generated subqueries as table inputs of the logical plan.

5. The system of claim 4, wherein, to compute the access plan for a subquery in the generated subqueries, the instructions are further to cause the one or more processors to compute, separately for each of the one or more tables whose snowflake degree in the first subquery's snowflake schema exceeds zero, a respective access plan for obtaining the data requested by the subquery from each of the one or more tables whose snowflake degree in the subquery's snowflake schema exceeds zero.

6. The system of claim 4, wherein the database comprises a column store.

7. A non-transitory computer readable storage medium containing machine readable instructions readable by a computer system that, when executed by the computer system, perform a method, said machine readable instructions comprising code to cause the computer system to:
    accept input signals that represent a query that, applied to the database, defines a plurality of independent snowflake schemas in which each snowflake schema includes one or more pairs of join tables from the query;
    generate a subquery for each snowflake schema in which the subquery contains one or more join predicates that involve one or more attributes from one or more join tables of the snowflake schema;
    compute, for each of the generated subqueries, an access plan for obtaining from one or more tables of the subquery's snowflake schema data requested by the subquery, in which the access plan is associated with projections of the database's physical layout, in which the attribute values of the projections are stored in the physical layout according to respective sort orders of the projections, the access plan being for use in obtaining the results of the subqueries;
    execute the access plans for to obtain each subquery's results;
    generate an anchor query that joins the results produced by the subqueries into a result equivalent to a result produced by the query; and
    generate a logical plan for the anchor query that uses the results of the generated subqueries as table inputs of the logical plan.

8. The non-transitory computer readable storage medium of claim 7, said machine readable instructions further comprising code to cause the computer system to:
    compute, separately for each of the one or more tables whose snowflake degree in the subquery's snowflake schema exceeds zero, a respective access plan for obtaining the data requested by the query from each of the one or more tables whose snowflake degree in the subquery's snowflake schema exceeds zero.

9. The non-transitory computer readable storage medium of claim 7, wherein the database comprises a column store.

10. The method of claim 2, wherein each of the one or more tables whose snowflake degree in the subquery's snowflake schema exceeds zero is treated as a fact table of a star schema and the method comprises treating as a dimension table of that star schema any snowflake-degree-zero table directly reachable from each of the one or more tables whose snowflake degree in the subquery's snowflake schema exceeds zero.

11. The method of claim 2, wherein each of the one or more tables whose snowflake degree in the subquery's snowflake schema exceeds zero is treated as a fact table of a star schema and the method comprises treating as a dimension table of that star schema any results from execution of the access plan determined for each table of snowflake degree greater than zero that is directly reachable from the one or more tables whose snowflake degree in the subquery's snowflake schema exceeds zero.

12. The method of claim 1, wherein each subquery's respective access plan is selected based on a consideration of a space of self-similar left-deep trees defined by primary-key/foreign-key relationships among tables in the subquery's snowflake schema.

13. The method of claim 12, wherein each snowflake schema's respective access plan is selected based on evaluation of the space in view of the projections provided by the database's physical layout.

14. The system of claim 5, wherein each of the one or more tables whose snowflake degree in the subquery's snowflake schema exceeds zero is treated as a fact table of a star schema and the instructions are further to cause the one or more processors to treat as a dimension table of that star schema any snowflake-degree-zero table directly reachable from the one or more tables whose snowflake degree in the subquery's schema exceeds zero.

15. The system of claim 5, wherein each of the one or more tables whose snowflake degree in the subquery's snowflake schema exceeds zero is treated as a fact table of a star schema and the instructions are further to cause the one or more processors to treat as a dimension table of that star schema any result from execution of the access plan determined for each table of snowflake degree greater than zero that is directly reachable from the one or more tables whose snowflake degree in the subquery's schema exceeds zero.

16. The system of claim 4, wherein each snowflake schema's respective access plan is selected based on a consideration of a space of self-similar left-deep trees defined by primary-key/foreign-key relationships among tables in the snowflake schema.

17. The system of claim 16, wherein each snowflake schema's respective access plan is selected based on evaluation of the space in view of the projections provided by the database's physical layout.

18. The system of claim 4, wherein each snowflake schema includes one or more pairs of join tables from the query such that a first table in each pair is reachable from a second table in the pair.

19. The non-transitory computer readable storage medium of claim 8, wherein each of the one or more tables whose snowflake degree in the subquery's snowflake schema exceeds zero is treated as a fact table of a star schema and any snowflake-degree-zero table directly reachable from the one or more tables whose snowflake degree in the subquery's snowflake schema exceeds zero is treated as a dimension table of that star schema.

20. The non-transitory computer readable storage medium of claim 8, wherein each of the one or more tables whose snowflake degree in the subquery's snowflake schema exceeds zero is treated as a fact table of a star schema and any result from execution of the access plan determined for each table of snowflake degree greater than zero that is directly reachable from the one or more tables whose snowflake degree in the subquery's snowflake schema exceeds zero is treated as a dimension table of that star schema.

21. The non-transitory computer readable storage medium of claim 7, wherein each snowflake schema's respective access plan is selected based on a consideration of a space of self-similar left-deep trees defined by primary-key/foreign-key relationships among tables in the snowflake schema.

22. The non-transitory computer readable storage medium of claim 21, wherein each snowflake schema's respective access plan is selected based on evaluation of the space in view of the projections provided by the database's physical layout.

23. The non-transitory computer readable storage medium of claim 7, wherein each snowflake schema includes one or more pairs of join tables from the query such that a first table in each pair is reachable from a second table in the pair.

24. The method of claim 1, wherein the access plan for each of the generated subqueries is associated with projections of the database's physical layout, and wherein attribute values of the projections are stored in the physical layout according to respective sort orders of the projections, the access plan being for use in obtaining the results of the subquery.

25. The system of claim 4, wherein the access plan for each of the generated subqueries is associated with projections of the database's physical layout, and wherein attribute values of the projections are stored in the physical layout according to respective sort orders of the projections, the access plan being for use in obtaining the results of the subquery.

* * * * *

UNITED STATES PATENT AND TRADEMARK OFFICE
CERTIFICATE OF CORRECTION

Page 1 of 1

PATENT NO.       : 8,671,091 B2
APPLICATION NO.  : 11/461937
DATED            : March 11, 2014
INVENTOR(S)      : Mitch Cherniack et al.

It is certified that error appears in the above-identified patent and that said Letters Patent is hereby corrected as shown below:

In the Claims

In column 18, line 35, in Claim 7, delete "for to" and insert -- to --, therefor.

Signed and Sealed this
Fifth Day of August, 2014

Michelle K. Lee
*Deputy Director of the United States Patent and Trademark Office*